United States Patent
Kim et al.

(10) Patent No.: US 11,682,791 B2
(45) Date of Patent: Jun. 20, 2023

(54) SOLID ELECTROLYTE, ELECTROCHEMICAL BATTERY INCLUDING THE SOLID ELECTROLYTE, AND METHOD OF PREPARING THE SOLID ELECTROLYTE

(71) Applicant: Samsung SDI Co., Ltd., Yongin-si (KR)

(72) Inventors: Hyunseok Kim, Suwon-si (KR); Saebom Ryu, Suwon-si (KR); Seoksoo Lee, Yongin-si (KR); Soyeon Kim, Suwon-si (KR)

(73) Assignee: SAMSUNG SDI CO., LTD., Gyeonggi-Do (KR)

( * ) Notice: Subject to any disclaimer, the term of this patent is extended or adjusted under 35 U.S.C. 154(b) by 226 days.

(21) Appl. No.: 17/036,266

(22) Filed: Sep. 29, 2020

(65) Prior Publication Data
US 2021/0135278 A1  May 6, 2021

(30) Foreign Application Priority Data
Nov. 6, 2019 (KR) .................. 10-2019-0140946

(51) Int. Cl.
*H01M 10/0562* (2010.01)
*C01D 15/00* (2006.01)
(Continued)

(52) U.S. Cl.
CPC ........ *H01M 10/0562* (2013.01); *C01D 15/00* (2013.01); *H01M 4/366* (2013.01);
(Continued)

(58) Field of Classification Search
CPC ..... C01B 25/14; C01D 15/00; C01P 2002/74; C01P 2006/40; H01M 10/052; H01M 10/0525; H01M 10/0562; H01M 10/0585; H01M 2004/027; H01M 2004/028; H01M 2300/0068; H01M 2300/008;
(Continued)

(56) References Cited

U.S. PATENT DOCUMENTS 6,402,795 B1  6/2002 Chu et al.
7,993,782 B2  8/2011 Takada et al.
(Continued)

FOREIGN PATENT DOCUMENTS

EP  3407412 A1  11/2018
KR  1020160064942 A  6/2016
(Continued)

OTHER PUBLICATIONS

Nazar et al, "Boosting solid-state diffusivity and conductivity in lithium superionic argyrodites by halide substitution", Angewandte Chemie International Edition, 58, 2019, 8681-8686.
(Continued)

*Primary Examiner* — Victoria H Lynch
(74) *Attorney, Agent, or Firm* — Cantor Colburn LLP

(57) ABSTRACT

A solid electrolyte includes a compound having an argyrodite crystal structure represented by Formula 1, $$Li_aM_xPS_bBr_cX_d.\quad\text{Formula 1}$$

wherein Formula 1,
M is Na, K, Fe, Mg, Ca, Ag, Cu, Zr, Zn, or a combination thereof;
X is Cl, I, or a combination thereof; and
$0 \leq x < 1$, $5 \leq (a+x) < 7$, $5 \leq a \leq 6$, $4 \leq b \leq 6$, $0 < (c+d) \leq 2$, and $(c/d) > 4$.

27 Claims, 11 Drawing Sheets

(51) Int. Cl.
*H01M 4/36* (2006.01)
*H01M 4/485* (2010.01)
*H01M 10/052* (2010.01)
*H01M 10/0585* (2010.01)

(52) U.S. Cl.
CPC ......... *H01M 4/485* (2013.01); *H01M 10/052* (2013.01); *H01M 10/0585* (2013.01); *C01P 2002/74* (2013.01); *C01P 2006/40* (2013.01); *H01M 2300/008* (2013.01)

(58) Field of Classification Search
CPC ...... H01M 4/133; H01M 4/134; H01M 4/366; H01M 4/382; H01M 4/485; H01M 4/525; H01M 4/587; H01M 4/62; Y02E 60/10; Y02P 70/50
See application file for complete search history.

(56) References Cited

U.S. PATENT DOCUMENTS

| | | | |
|---|---|---|---|
| 8,075,865 | B2 | 12/2011 | Deiseroth et al. |
| 9,214,674 | B2 | 12/2015 | Yoshida |
| 9,634,358 | B2 | 4/2017 | Matsushita |
| 9,673,482 | B2 | 6/2017 | Kambara et al. |
| 9,812,734 | B2 | 11/2017 | Miyashita et al. |
| 9,899,701 | B2 | 2/2018 | Miyashita et al. |
| 9,899,702 | B2 | 2/2018 | Miyashita et al. |
| 10,090,558 | B2 | 10/2018 | Kambara et al. |
| 10,340,506 | B2 | 7/2019 | Aihara et al. |
| 2014/0093786 | A1 | 4/2014 | Ito et al. |
| 2015/0147660 | A1 | 5/2015 | Fujiki et al. |
| 2016/0248120 | A1 | 8/2016 | Yamada et al. |
| 2017/0187066 | A1 | 6/2017 | Tsujimura et al. |
| 2018/0226633 | A1 | 8/2018 | Fujiki et al. |
| 2018/0351148 | A1 | 12/2018 | Schneider et al. |
| 2019/0140314 | A1 | 5/2019 | Utsuno et al. |
| 2019/0198916 | A1 | 6/2019 | Yoon et al. |
| 2019/0305371 | A1 | 10/2019 | Utsuno et al. |
| 2020/0127325 | A1 | 4/2020 | Takahashi et al. |

FOREIGN PATENT DOCUMENTS

| | | |
|---|---|---|
| KR | 1020170077014 A | 7/2017 |
| WO | 2018139868 A1 | 8/2018 |
| WO | 2019009228 A1 | 1/2019 |

OTHER PUBLICATIONS

Zhu et al. "Origin of Outstanding Stability in the Lithium Solid Electrolyte Materials: Insights from Thermodynamic Analyses Based on First-Principles Calculations", Applied Materials & Interfaces, 7, 2015, 23685-23693.

European Search Report for European Patent Application No. 20200437.0 dated Mar. 29, 2021.

Zhou et al. "Solvent-Engineered Design of Argyrodite Li6PS5X(X= Cl, Br, I) Solid Electrolytes with High Ionic Conductivity", ACS Energy Ltt. 2019, 4, 265-270.

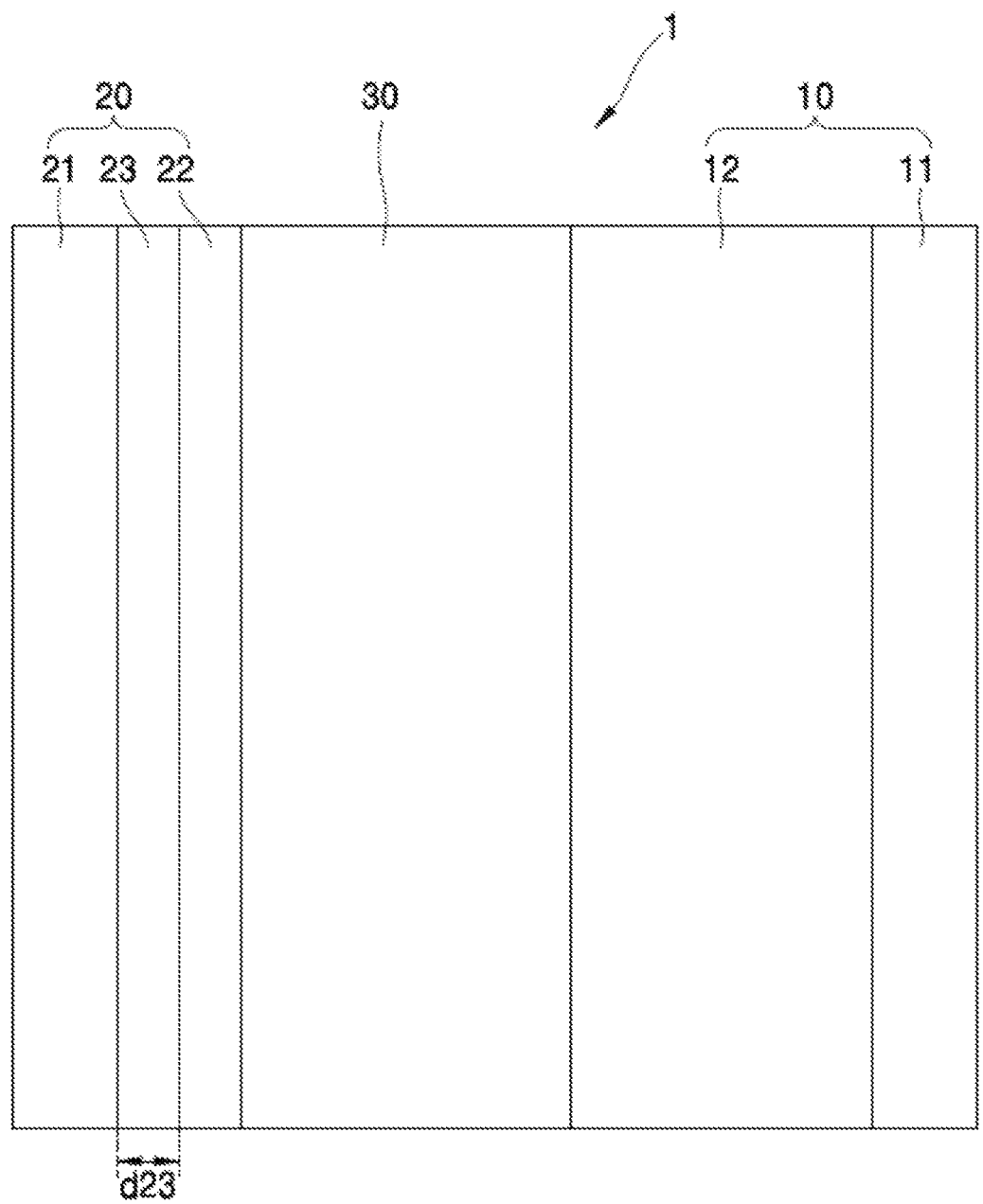

SOLID ELECTROLYTE, ELECTROCHEMICAL BATTERY INCLUDING THE SOLID ELECTROLYTE, AND METHOD OF PREPARING THE SOLID ELECTROLYTE

CROSS-REFERENCE TO RELATED APPLICATION

This application claims priority to and the benefit of Korean Patent Application No. 10-2019-0140946, filed on Nov. 6, 2019, in the Korean Intellectual Property Office, and all the benefits accruing therefrom under 35 U.S.C. § 119, the content of which is incorporated herein in its entirety by reference.

BACKGROUND

1. Field

The present disclosure relates to a solid electrolyte, an electrochemical battery including the solid electrolyte, and a method of preparing the solid electrolyte.

2. Description of Related Art

Recently, due to industrial demands, development of batteries having high energy density and improved safety has become increasingly important. For example, lithium ion batteries have been put to practical use in automobiles, as well as in information-related appliances and communication appliances. Safety precautions are particularly important in the field of automobiles because the precautions relate to the protection human life.

Commercially available lithium ion batteries use a liquid electrolyte containing a flammable organic solvent, and therefore, there is a possibility of overheating and fire when a short circuit occurs. For this reason, all-solid-state batteries using a solid electrolyte, instead of an electrolyte solution, are desired.

When an all-solid-state secondary battery does not use a flammable organic solvent, a possibility of fire or explosion may be greatly reduced, even when a short circuit occurs. Therefore, such an all-solid-state secondary battery may be significantly safer than a lithium ion battery using a liquid electrolyte.

A sulfide-based solid electrolyte used as a solid electrolyte in an all-solid-state secondary battery may have excellent ion conductivity. However, sulfide-based solid electrolytes have poor oxidation stability at high potentials, and thus, there remains a need for a solid electrolyte with improved oxidation stability.

SUMMARY

Provided is a solid electrolyte having improved oxidation stability at a high voltage.

Provided is an electrochemical battery including the solid electrolyte and having improved cycle characteristics.

Provided is a method of preparing the solid electrolyte.

Additional aspects will be set forth in part in the description which follows and, in part, will be apparent from the description.

According to an aspect, a solid electrolyte includes: a compound having an argyrodite crystal structure and represented by Formula 1,

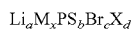            Formula 1 wherein, in Formula 1,

M is Na, K, Fe, Mg, Ca, Ag, Cu), Zr, Zn, or a combination thereof;

X is Cl, I, or a combination thereof; and

0≤x<1, 5≤(a+x)<7, 5≤a≤6, 4≤b≤6, 0<(c+d)≤2, and (c/d)>4.

According to an aspect, an electrochemical battery includes: a cathode layer; an anode layer; and a solid electrolyte layer between the cathode layer and the anode layer, wherein the solid electrolyte layer includes the solid electrolyte.

According to an aspect, a method of preparing a solid electrolyte includes: providing a precursor mixture including a phosphorus (P) precursor, a sulfur (S) precursor, a bromine (Br) precursor, and an X precursor, wherein the X precursor includes Cl, I, or a combination thereof; contacting the precursor mixture to form a solid electrolyte precursor; and heat-treating the solid electrolyte precursor at a temperature of about 200° C. to about 1000° C. to prepare the solid electrolyte, wherein the solid electrolyte is a compound having an argyrodite crystal structure and represented by Formula 1

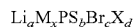            Formula 1 wherein, in Formula 1,

M is Na, K, Fe, Mg, Ca, Ag, Cu, Zr, Zn, or a combination thereof;

X is Cl, I, or a combination thereof, and

0≤x<1, 5≤(a+x)<7, 5≤a≤6, 4≤b≤6, 0<(c+d)≤2, and (c/d)>4.

According to an aspect, the heat-treating of the solid electrolyte precursor is at a temperature of about 350° C. to about 550° C.

An M precursor may be added to the precursor mixture, wherein M includes sodium (Na), potassium (K), iron (Fe), magnesium (Mg), calcium (Ca), silver (Ag), copper (Cu), zirconium (Zr), zinc (Zn), or a combination thereof.

According to an aspect, a solid electrolyte includes:

a compound having an argyrodite crystal structure and represented by Formula 1; and a compound having an argyrodite crystal structure and represented by Formula 6,

            Formula 1 wherein, in Formula 1,

M is Na, K, Fe, Mg, Ca, Ag, Cu, Zr, Zn, or a combination thereof,

X is Cl, I, or a combination thereof, and

0≤x<1, 5≤(a+x)<7, 5≤a≤6, 4≤b≤6, 0<(c+d)≤2, and (c/d)>4, $$Li_{12-n-x}AX_{6-x}Y'_x$$            Formula 6 wherein in Formula 6,

A is P, As, Ge, Ga, Sb, Si, Sn, A, In, Ti, V, Nb, or Ta,

X is S, Se, or Te,

Y' is Cl, Br, I, F, CN, OCN, SCN, or $N_3$, and

0<x<2, and 2≤n≤6.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7 to 9 are cross-sectional views illustrating structures of all-solid-state secondary batteries.

DETAILED DESCRIPTION

Figure 1A:
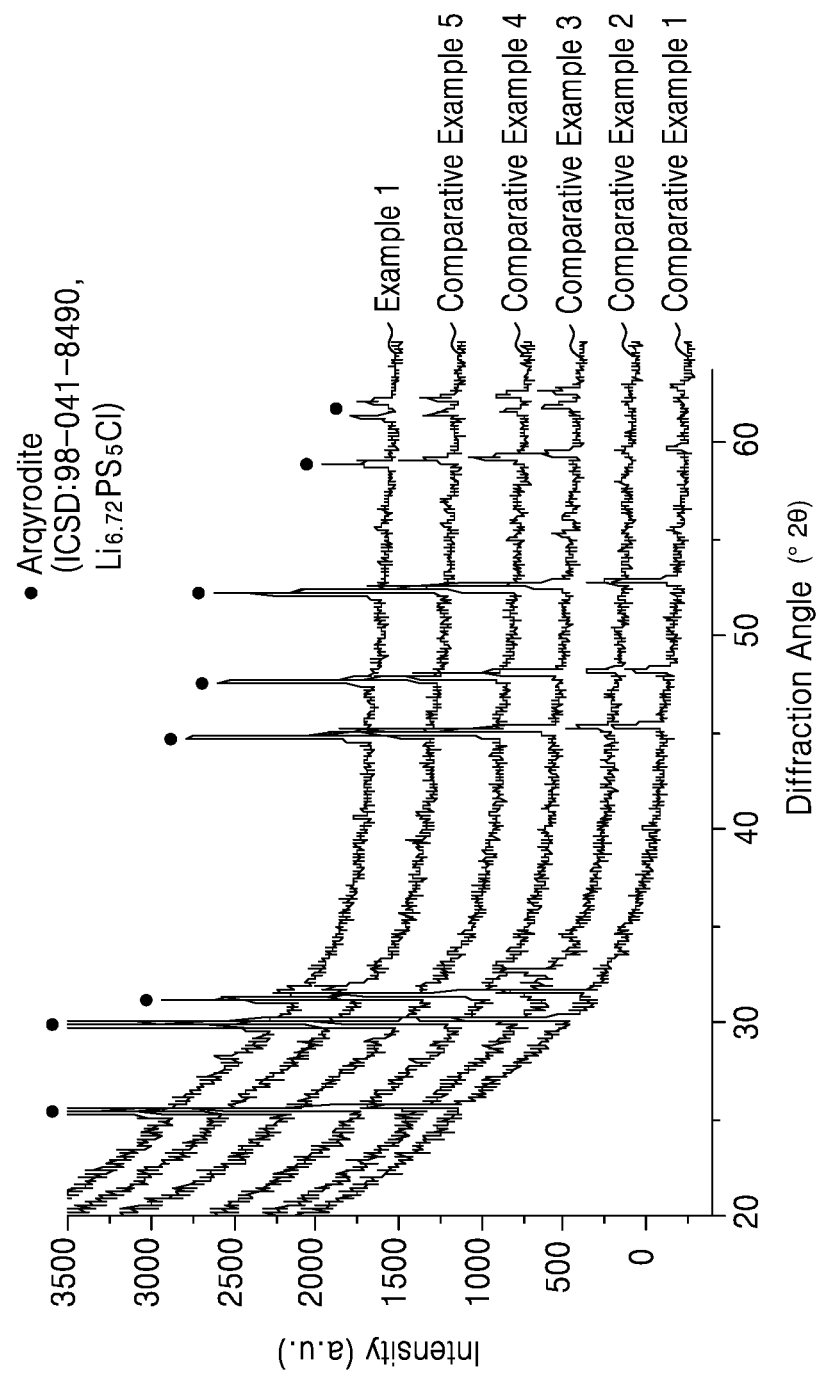
FIG. 1A is a graph of intensity in arbitrary units (a.u.) versus diffraction angle (°2θ) of the solid electrolytes prepared in Example 1 and Comparative Examples 1 to 5, when analyzed by X-ray diffraction using Cu Kα radiation.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "argyrodite structure" or "argyrodite crystal structure" means that the compound has a structure that is isostructural with argyrodite, $Ag_8GeSe_6$.

A C rate means a current which will discharge a battery in one hour, e.g., a C rate for a battery having a discharge capacity of 1.6 ampere-hours would be 1.6 amperes.

Hereinafter, a solid electrolyte, an electrochemical battery including a solid electrolyte layer including the solid electrolyte, and a method of preparing a solid electrolyte will be described in further detail.

Provided is a solid electrolyte including: a compound having argyrodite crystal structure and represented by Formula 1.

$$Li_aM_xPS_bBr_cX_d \quad \text{Formula 1}$$

In Formula 1, M is sodium (Na), potassium (K), iron (Fe), magnesium (Mg), calcium (Ca), silver (Ag), copper (Cu), zirconium (Zr), zinc (Zn), or a combination thereof; X is chlorine (Cl), iodine (I), or a combination thereof; and $0 \leq x < 1$ and $5 \leq (a+x) < 7$, $5 \leq a \leq 6$, $4 \leq b \leq 6$, and $0 < (c+d) \leq 2$, $(c/d) > 4$, $c > 0$, and $d > 0$.

In Formula 1, $5 \leq (a+x) \leq 6$. In Formula 1, $0 \leq x \leq 0.07$, for example, x is about 0.01 to about 0.06, for example, about 0.02 to about 0.05.

In Formula 1, (c/d) is 5 or more, for example about 5 to about 199, for example about 5 to about 125, for example about 5 to about 20, for example about 5 to about 14, for example about 8 to about 14. In Formula 1, $5 \leq (a+x) \leq 6$.

In order to provide an all-solid-state secondary battery with high energy density, a solid electrolyte with both high ionic conductivity and stability at a high voltage is desired. Although an argyrodite-based solid electrolyte may have excellent ionic conductivity, oxidation stability at a high voltage is not satisfactory, and thus, an improved solid electrolyte is desired.

The present inventors have surprisingly discovered a solid electrolyte having excellent ion conductivity and improved oxidation stability at high voltage by selecting the mixing ratio of halogen atoms in the argyrodite-based solid electrolyte.

In an aspect, X in Formula 1 is C. The argyrodite-based solid electrolyte according to an embodiment may be, for example, a compound represented by Formula 2.

$$Li_aM_xPS_bBr_cCl_d \quad \text{Formula 2}$$

In Formula 2, M is Na, K, Fe, Mg, Ca, Ag, Cu, Zr, Zn, or a combination thereof, $0 \leq x \leq 0.07$, $5 \leq a \leq 6$, $4 \leq b \leq 6$, and $0 < (c+d) \leq 2$, $5 \leq (a+x) \leq 6$, and $(c/d) > 4$.

The argyrodite-based solid electrolyte may be a sulfide-based solid electrolyte.

In an aspect, $0 \leq x \leq 0.07$. In an aspect, X in the compound represented by Formula 1 is Cl, $0 \leq x \leq 0.07$, and $5 \leq (a+x) \leq 6$.

The compound represented by Formula 1 may be a compound represented by Formula 3.

$$(Li_{1-x1}M_{x1})_{7-y}PS_{6-y}(Br_{1-x2}Cl_{x2})_y \quad \text{Formula 3}$$

In Formula 3, M is Na, K, Fe, Mg, Ca, Ag, Cu, Zr, Zn, or a combination thereof, and, $0 \leq x1 < 1$, $0 < x2 < 1$, and $0 \leq y \leq 2$.

In an aspect, in the compound represented by Formula 3, M is Na, K, or a combination thereof.

The compound represented by Formula 1 may be a compound represented by Formula 4 or a compound represented by Formula 5.

$$(Li_{1-x1}Na_{x1})_{7-y}PS_{6-y}(Br_{1-x2}Cl_{x2})_y \quad \text{Formula 4}$$

In Formula 4, $0 \leq x1 < 1$, $0 < x2 < 1$, and $0 \leq y \leq 2$.

$$(Li_{1-x1}K_{x1})_{7-y}PS_{6-y}(Br_{1-x2}Cl_{x2})_y \quad \text{Formula 5}$$

In Formula 5, $0 \leq x1 < 1$, $0 < x2 < 1$, and $0 \leq y \leq 2$.

In Formulae 4 and 5, x1 is about 0.01 to about 0.9, for example about 0.02 to about 0.5, for example about 0.03 to about 0.2, for example about 0.03 to about 0.1, and x2 is about 0.01 to about 0.9, for example about 0.02 to about 0.8, for example about 0.03 to about 0.5, for example about 0.05 to about 0.4, for example about 0.06 to about 0.2.

The compound represented by Formula 1 may be, for example, $Li_{5.45}Na_{0.05}PS_{4.5}Cl_{0.25}Br_{1.25}$, $Li_{5.5}PS_{4.5}Cl_{0.25}Br_{1.25}$, $Li_{5.45}Na_{0.05}PS_{4.5}Cl_{0.1}Br_{1.4}$, $Li_{5.5}PS_{4.5}Cl_{0.1}Br_{1.4}$, $Li_{4.95}Na_{0.05}PS_4Cl_{0.01}Br_{1.99}$, $Li_{5.74}PS_{4.74}Cl_{0.01}Br_{1.25}$, $Li_5PS_4Cl_{0.01}Br_{1.99}$, $Li_{5.45}K_{0.05}PS_{4.5}Cl_{0.25}Br_{1.25}$, $Li_{5.45}K_{0.05}PS_{4.5}Cl_{0.1}Br_{1.4}$, $Li_{4.95}K_{0.05}PS_4Cl_{0.01}Br_{1.99}$, $Li_{5.45}Na_{0.05}PS_{4.5}Cl_{1.5}$, $(Li_{5.45}Na_{0.05})PS_{4.5}Cl_{0.2}Br_{1.25}$, or a combination thereof. When analyzed by X-ray diffraction using CuKα radiation, the compound of Formula 1 has a first peak at $2\theta = 29.82° \pm 0.05°$ corresponding to a (311) crystal plane, and a second peak at $2\theta = 31.18° \pm 0.05°$ corresponding to a (222) crystal plane. Further, when analyzed by X-ray diffraction using CuKα radiation, the compound of Formula 1 may exhibit a third peak at $44.62° \pm 0.11°2\theta$, corresponding to a (422) crystal plane, a fourth peak at $47.47° \pm 0.12°2\theta$, corresponding to a (511) crystal plane, and a fifth peak at $51.99° \pm 0.1°2\theta$ corresponding to a (440) crystal plane.

The solid electrolyte according to an embodiment has an ionic conductivity of about 1 millisiemens per centimeter (mS/cm) or more, about 1.3 mS/cm or more, about 1.6 mS/cm or more, about 2 mS/cm or more, about 2 mS/cm to about 20 mS/cm, about 3 mS/cm to about 17 mS/cm, about 4 mS/cm to about 15 mS/cm, or about 6 mS/cm to about 10 mS/cm at 25° C. When the solid electrolyte has a high ionic conductivity of about 1 mS/cm or more, the solid electrolyte may be used as an electrolyte of an electrochemical battery.

The electrochemical battery may be, but is not limited to, an all-solid-state secondary battery or a lithium air battery. The solid electrolyte may be used to provide any suitable electrochemical battery.

An electrochemical battery according to an embodiment includes: a cathode layer; an anode layer; and a solid electrolyte layer between the cathode layer and the anode layer, wherein the solid electrolyte layer includes the solid electrolyte. When the solid electrolyte layer includes the solid electrolyte, a side reaction with a lithium metal included in the anode layer is suppressed, and thus, cycle characteristics of the electrochemical battery are improved. The electrochemical battery may be an all-solid-state secondary battery.

In the electrochemical battery according to an embodiment, the cathode layer includes a solid electrolyte including a compound having an argyrodite crystal structure represented by Formula 1.

$$Li_aM_xPS_bBr_cX_d \quad \text{Formula 1}$$

In Formula 1, M is sodium (Na), potassium (K), iron (Fe), magnesium (Mg), calcium (Ca), silver (Ag), copper (Cu), zirconium (Zr), zinc (Zn), or a combination thereof, X is chlorine (Cl), iodine (I), or a combination thereof, $0 \leq x < 1$ and $5 \leq (a+x) < 7$, $5 \leq a \leq 6$, $4 \leq b \leq 6$, $0 < (c+d) \leq 2$, and $(c/d) > 4$.

When the cathode layer includes the solid electrolyte according to an embodiment, the lithium ion conductivity of the electrochemical battery and the stability of the electrochemical battery to a lithium metal are improved. The solid electrolyte may serve as an ion conductor.

The content of the solid electrolyte in the cathode layer is about 2 parts by weight to about 70 parts by weight, for example about 3 parts by weight to about 30 parts by weight, or about 5 parts by weight to about 15 parts by weight, based on 100 parts by weight of the cathode active material. When the content of the solid electrolyte in the cathode layer is within this range, the stability of the electrochemical battery at high voltage is improved.

In an aspect, the content of the solid electrolyte in the cathode layer is about 2 parts by weight to about 70 parts by weight, for example about 3 parts by weight to about 30 parts by weight, or about 5 parts by weight to about 15 parts by weight, based on 100 parts by weight of the cathode layer. When the content of the solid electrolyte in the cathode layer is within these ranges, the stability of the electrochemical battery at high voltage is improved.

The all-solid-state secondary battery has a capacity retention of about 65 percent to 100 percent, for example, about 85 percent to 100 percent, after the all-solid-state secondary battery is charged to 4.25 volts and tested at 45° C. or 60° C., and then discharged.

For example, when the electrochemical battery is charged to 4 Volts (V) or more, for example to between 4 V and 5V, tested at 45° C. for 40 hours or at 60° C. for 10 days, initially discharged, charged, and then further discharged, the capacity retention of the electrochemical battery is about 65% to about 100%, about 70% to about 100%, about 75% to about 99%, 85% to about 99%, or about 89% to about 99%. For example, when the electrochemical battery is charged to 4.25 V, and maintained at 45° C. for 40 hours in a constant voltage (CV) state, initially discharged, charged, and then further discharged, the capacity retention of the electrochemical battery is about 70% or more, about 85% or more, for example about 89% or more, e.g., about 85% to about 100%, or about 89% to about 99%. Further, when the electrochemical battery is charged to 4.25 V to 5 V, tested at 60° C. for 7 days, initially discharged, charged, and then further discharged, the capacity retention of the electrochemical battery is about 70% or more, about 85% or more, for example about 87% or more, e.g., about 85% to about 100%, or about 89% to about 99%. In an aspect, the electrochemical battery may be charged to a voltage between 4V and 5V, tested at a temperature between 40° C. and 80° C. for 1 day (24 hours) to 10 days, and then initially discharged, charged, and further discharged to analyze capacity retention of the electrochemical battery.

An all-solid-state secondary battery in the electrochemical battery will be described in further detail.

Figure 7:
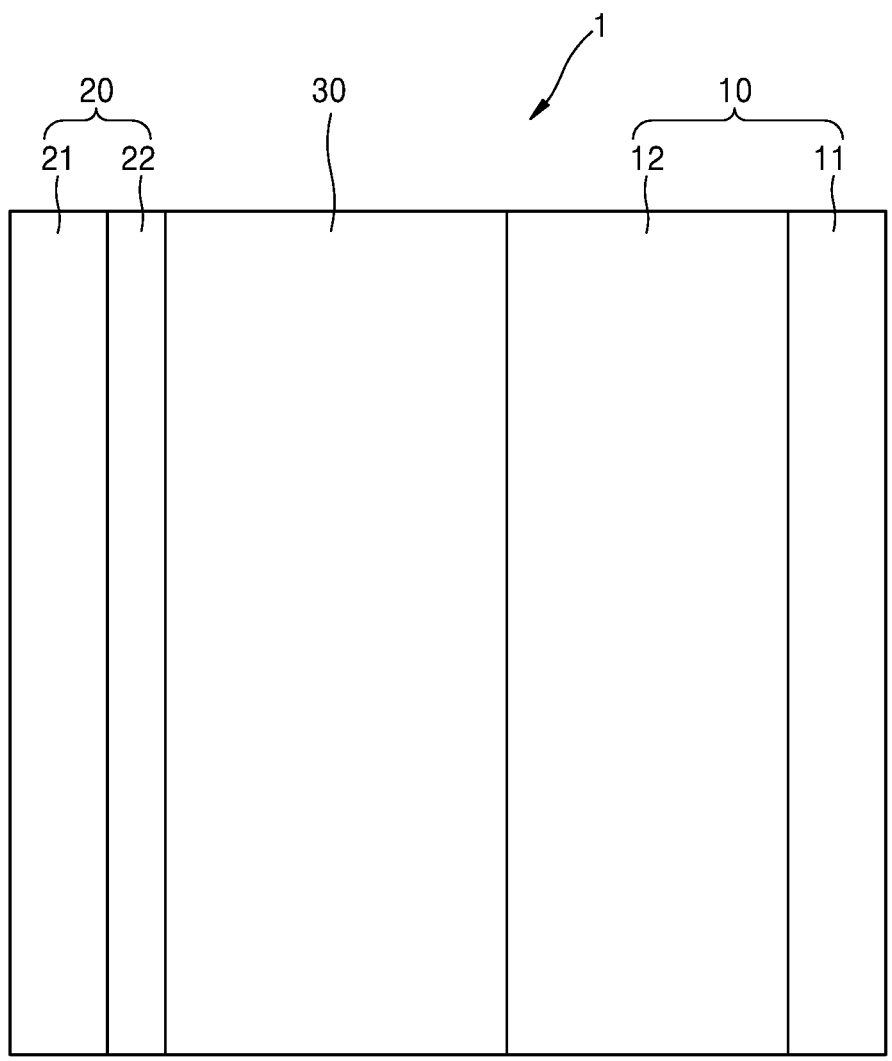
Figure 8:
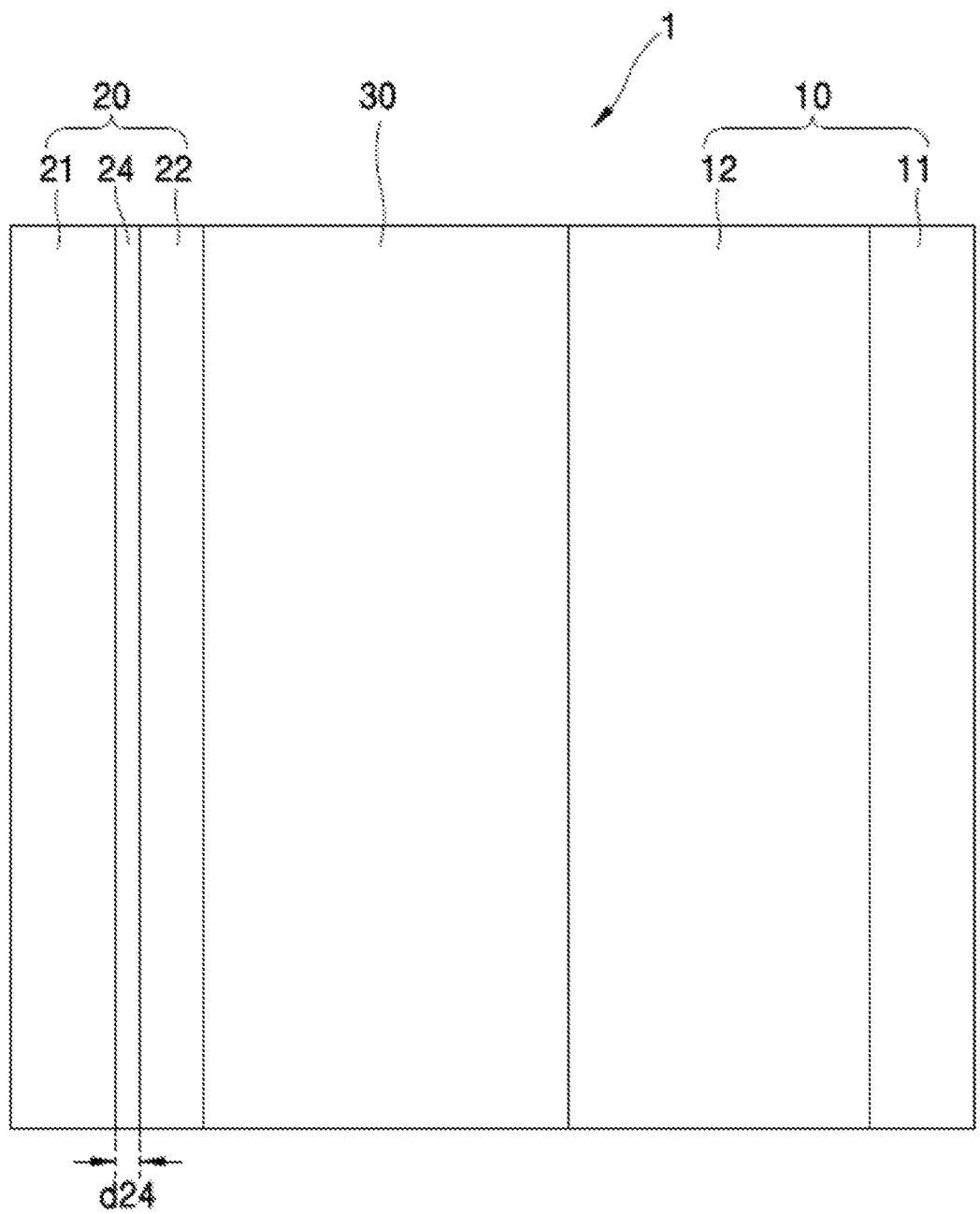

Referring to FIGS. 7 to 9, an all-solid-state secondary battery 1 includes an anode layer 20 including an anode current collector layer 21 and a first anode active material layer 22, a cathode layer 10 including a cathode active material layer 12, and a solid electrolyte layer 30 between the anode layer 20 and the cathode layer 10. The cathode layer 10 may contain a solid electrolyte according to an embodiment. For example, the cathode layer 10 contains a cathode active material, a solid electrolyte, and a conductive material.

Anode Layer

Referring to FIGS. 7 to 9, the anode layer 20 includes an anode current collector layer 21 and a first anode active material layer 22, and the first anode active material layer 22 includes an anode active material.

The anode active material included in the first anode active material layer 22 may be in the form of a particle. The average particle diameter of the anode active material in the form of a particle is, for example, about 4 um or less, about 3 um or less, about 2 um or less, about 1 um or less, or about 900 nm or less. The average particle diameter of the anode active material in the form of a particle is, for example, about 10 nm to about 4 um, about 11 nm to about 3 um, about 12 nm to about 2 um, about 13 nm to about 1 um, or about 14 nm to about 900 nm. When the average particle diameter of the anode active material is within these ranges, reversible absorbing and desorbing of lithium may easily occur during charge and discharge. The average particle diameter of the anode active material is, for example, a median diameter (D50) measured using a laser particle size distribution meter.

The anode active material included in the first anode active material layer includes a carbon anode active material, a metal anode active material, a metalloid anode active material, or a combination thereof.

The carbon-based anode active material may be amorphous carbon. Examples of the amorphous carbon may include, but are not limited to, carbon black (CB), acetylene black (AB), furnace black (FB), ketjen black (KB), or graphene. Any suitable amorphous carbon may be used. The amorphous carbon, which is carbon having no crystallinity or having low crystallinity, is distinguished from crystalline carbon or graphite-based carbon.

The metal-based or metalloid-based anode active material may include, but is not limited to, gold (Au), platinum (Pt), palladium (Pd), silicon (Si), silver (Ag), aluminum (A), bismuth (Bi), tin (Sn), zinc (Zn), or a combination thereof. Any suitable metal or metalloid anode active material may be used as long as it is a material capable of forming an alloy or compound with lithium. For example, nickel (Ni) is not a metal anode active material because it does not form an alloy with lithium.

The first anode active material layer 22 includes one of these anode active materials or comprises a mixture of a plurality of different anode active materials. For example, the first anode active material layer 22 may include only amorphous carbon, or may include gold (Au), platinum (Pt), palladium (Pd), silicon (Si), silver (Ag), aluminum (Al), bismuth (Bi), tin (Sn), zinc (Zn), or a combination thereof. Furthermore, the first anode active material layer 22 may include a mixture of amorphous carbon and gold (Au), platinum (Pt), palladium (Pd), silicon (Si), silver (Ag), aluminum (Al), bismuth (Bi), tin (Sn), zinc (Zn), or a combination thereof. The weight ratio of amorphous carbon to gold in the mixture of the amorphous carbon and gold is, for example, about 10:1 to about 1:2, about 5:1 to about 1:1, or about 4:1 to about 2:1, but is not limited thereto. The ratio thereof may be selected according to the desired characteristics of the all-solid-state secondary battery 1. When the anode active material has such a composition, the cycle characteristics of the all-solid-state secondary battery 1 are improved.

The anode active material included in the first anode active material layer includes a mixture of first particles of amorphous carbon and second particles of a metal or a metalloid. Examples of the metal or the metalloid include gold (Au), platinum (Pt), palladium (Pd), silicon (Si), silver (Ag), aluminum (Al), bismuth (Bi), tin (Sn), or zinc (Zn).

The metalloid is otherwise a semiconductor. The content of the second particle is about 8 weight percent (wt %) to about 60 wt %, about 10 wt % to about 50 wt %, about 15 wt % to about 40 wt %, or about 20 wt % to about 30 wt %. When the content of the second particle is within this range, for example, the cycle characteristics of the all-solid-state secondary battery are improved.

The first anode active material layer 22 includes a binder. Example of the binder may include, but are not limited to, styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile, or polymethylmethacrylate. Any suitable binder may be used. The binder may be used alone or may be used as a plurality of different binders.

When the first anode active material layer 22 includes the binder, the first anode active material layer 22 is stabilized on the anode current collector 21. Cracks in the first anode active material layer 22 are suppressed during a charge-discharge process, in spite of the volume change and/or relative position change of the first anode active material layer 22. For example, when the first anode active material layer 22 does not include the binder, the first anode active material layer 22 may be easily separated from the anode current collector 21. A portion of the anode active material layer 22 separated from the anode current collector 21 exposes the anode current collector to contact the solid electrolyte layer 30, thereby increasing a possibility of a short circuit. The anode active material layer 22 is manufactured by applying a slurry, in which a material of the anode active material layer 22 is dispersed, onto the anode current collector 21 and drying the slurry. The binder is included in the first anode active material layer 22, thereby enabling the stable dispersion of an anode active material in the slurry. For example, when the slurry is applied onto the anode current collector 21 by screen printing, it is possible to prevent the clogging of a screen (for example, clogging of a screen due to agglomerates of the anode active material).

The thickness d22 of the first anode active material layer is about 50% or less, about 40% or less, about 30% or less, about 20% or less, about 10% or less, or about 5% or less of the thickness d12 of the cathode active material layer. The thickness d22 of the first anode active material layer is about 1 um to about 20 um, about 2 um to about 10 um, or about 3 um to about 7 um. When the thickness d22 of the first anode active material layer is less than these ranges, a lithium dendrite formed between the first anode active material layer 22 and the anode current collector 21 disintegrates the first anode active material layer 22, and thus, may deteriorate the cycle characteristics of the all-solid-state secondary battery 1. When the thickness d22 of the first anode active material layer is more than these ranges, the energy density of the all-solid-state secondary battery 1 is lowered, and the internal resistance of the all-solid-state secondary battery 1 due to the first anode active material layer 22 increases. Thus the cycle characteristics of the all-solid-state secondary battery 1 may deteriorate if the first anode active material is too thick.

When the thickness d22 of the first anode active material layer decreases, the charge capacity of the first anode active material layer 22 also decreases. The charge capacity of the first anode active material layer 22 is about 50% or less, about 40% or less, about 30% or less, about 20% or less, about 10% or less, about 5% or less, or about 2% or less of the charge capacity of the cathode active material layer 12. For example, the charge capacity of the first anode active material layer 22 is about 0.1% to about 50%, about 0.2% to about 40%, about 0.3% to about 30%, about 0.4% to about 20%, about 0.5% to about 10%, or about 5% to about 10% of the charge capacity of the cathode active material layer 12. When the charge capacity of the first anode active material layer 22 is too small, the thickness of the first negative electrode active material layer 22 becomes very thin, so that a lithium dendrite formed between the first anode active material layer 22 and the anode current collector 21 disintegrates the first anode active material layer 22, and thus, the cycle characteristics of the all-solid-state secondary battery 1 may deteriorate. When the charge capacity of the first anode active material layer 22 increases to more than about 50%, the energy density of the all-solid-state secondary battery 1 is lowered, and the internal resistance of the all-solid-state secondary battery 1 due to the first anode active material layer 22 increases, which may deteriorate the cycle characteristics of the all-solid-state secondary battery 1.

The charge capacity of the cathode active material layer 12 may be obtained by multiplying the specific charge capacity (mAh/g) of the cathode active material by the mass of the cathode active material in the cathode active material layer 12. When several kinds of cathode active materials are used, values of charge capacity density times mass are calculated with respect to cathode active materials, and the sum of these values refers to the charge capacity of the cathode active material layer 12. The charge capacity of the first anode active material layer 22 is also calculated in the same manner. That is, the charge capacity of the first anode active material layer 22 is obtained by multiplying the specific charge capacity (mAh/g) of the anode active material by the mass of the anode active material in the first anode active material layer 22. When several kinds of anode active materials are used, values of charge capacity density times mass are calculated with respect to anode active materials, and the sum of these values refers to the charge capacity of the first anode active material layer 22. The charge capacity density of the cathode active material and the anode active material is a capacity estimated by using an all-solid-state half-cell using lithium metal as a counter electrode. The charge capacity of the cathode active material layer 12 and the charge capacity of the first anode active material layer 22 can be directly measured by charge capacity measurement using an all-solid-state half-cell. When the measured charge capacity is divided by the mass of the active material, a charge capacity density is obtained. Alternatively, the charge capacity of the cathode active material layer 12 and the charge capacity of the first anode active material layer 22 may be initial charge capacities measured during the first cycle.

The anode current collector 21 is made of, for example, a material that does not react with lithium, that is, does not form an alloy or a compound with lithium. Examples of the material constituting the anode current collector 21 may include, but are not limited to, copper (Cu), stainless steel, titanium (Ti), iron (Fe), cobalt (Co), or nickel (Ni). Any suitable material may be used as the anode current collector. The anode current collector 21 may be made of one of the foregoing metals, or may be made of an alloy of two or more metals or a coating material. The anode current collector 21 is made in the form of a plate or a foil.

The first anode active material layer 22 may further include an additive used in the conventional all-solid-state secondary battery 1, for example, a filler, a dispersant, an ion conductive material, or the like.

Referring to FIG. 8, the all-solid-state secondary battery 1 further includes a thin film 24 including an element capable of forming an alloy with lithium on the anode current collector 21. The thin film 24 is disposed between the anode current collector 21 and the first anode active material layer 22. The thin film 24 includes, for example, an element capable of forming an alloy with lithium. An example of the element capable of forming an alloy with lithium may include, but is not limited to, gold, silver, zinc, tin, indium, silicon, aluminum, or bismuth. Any suitable element may be used as long as it may form an alloy with lithium. The thin film 24 is made of one of these metals, or is made of an alloy of several kinds of metals. When the thin film 24 is disposed on the anode current collector 21, for example, a second anode active material layer (not shown) deposited between the thin film 24 and the first anode material layer 22 is further flattened, and thus, the cycle characteristics of the all-solid-state secondary battery 1 may be improved.

The thickness d24 of the thin film is, for example, about 1 nm to about 800 nm, about 10 nm to about 700 nm, about 50 nm to about 600 nm, or about 100 nm to about 500 nm. When the thickness d24 of the thin film 24 is less than 1 nm, the function of the thin film 24 may deteriorate. When the thin film 24 is too thick, the thin film 24 itself absorbs lithium, so that the amount of lithium deposited in the anode decreases, thereby decreasing the energy density of the all-solid-state battery and deteriorating the cycle characteristics of the all-solid-state secondary battery 1. The thin film 24 may be formed on the anode current collector 21 by vacuum deposition, sputtering or plating, but the method is not limited thereto. Any suitable method may be used to form the thin film 24.

Referring to FIG. 9, the all-solid-state secondary battery 1 further includes a second anode active material layer 23 disposed between the anode current collector 21 and the solid electrolyte layer 30 by charging. For example, the all-solid-state secondary battery 1 further includes a second anode active material layer 23 disposed between the anode current collector 21 and the first anode active material layer 22 during charge of the all-solid-state secondary battery. Although not shown in the drawings, the all-solid-state secondary battery 1 further includes a second anode active material layer 23 disposed between the solid electrolyte layer 30 and the first anode active material layer 22 by charging. Although not shown in the drawings, the all-solid-state secondary battery 1 further includes a second anode active material layer 23 disposed in the first anode active material layer 22 during charge of the all-solid-state secondary battery.

The second negative electrode active material layer 23 is a metal layer including lithium or a lithium alloy. Accordingly, when the second negative electrode active material layer 23 is a metal layer including lithium, the second negative electrode active material layer 23 acts as a lithium reservoir. Examples of the lithium alloy may include, but are not limited to, a Li—Al alloy, a Li—Sn alloy, a Li—In alloy, a Li—Ag alloy, a Li—Au alloy, a Li—Zn alloy, a Li—Ge alloy, or a Li—Si alloy. Any suitable lithium alloy may be used. The second anode active material layer 23 may be made of one of these alloys or lithium, or may be made of several alloys.

The thickness d23 of the second negative electrode active material layer is not limited, but is, for example, about 1 μm to about 1000 μm, about 2 μm to about 500 μm, about 3 μm to about 200 μm, about 4 μm to about 150 μm, about 5 μm to about 100 μm, or about 1 μm to about 50 μm. When the thickness d23 of the second anode active material layer is too thin, it is difficult for the second anode active material layer 23 to serve as a lithium reservoir. When the thickness d23 of the second anode active material layer is too thick, the mass and volume of the all-solid-state secondary battery 1 may increase and the cycle characteristics thereof may deteriorate. The second anode active material layer 23 may be, for example, a metal foil having a thickness in this range.

In the all-solid-state secondary battery 1, the second anode active material layer 23 is disposed between the anode current collector 21 and the first anode active material layer 22 before assembly of the all-solid-state secondary battery 1, or is deposited between the anode current collector 21 and the first anode active material layer 22 during charge, after assembly of the all-solid-state secondary battery 1.

When the second anode active material layer 23 is disposed between the anode current collector 21 and the first anode active material layer 22 before assembly of the all-solid-state secondary battery 1, the second anode active material layer 23 acts as a lithium reservoir because the second anode active material layer 23 is a metal layer including lithium. Thus the cycle characteristics of the all-solid-state secondary battery 1 including the second anode active material layer 23 are improved. For example, a lithium foil is disposed between the anode current collector 21 and the first anode active material layer 22 before assembly of the all-solid-state secondary battery 1.

When the second anode active material layer 23 is disposed during charge, after assembly of the all-solid-state secondary battery 1, the second anode active material layer 23 is not included during assembly of the all-solid-state secondary battery 1, and thus, energy density of the all-solid-state secondary battery 1 increases. For example, during charge of the all-solid-state secondary battery 1, the all-solid-state secondary battery 1 is charged to exceed the charge capacity of the first anode active material layer 22. That is, the first anode active material layer 22 is overcharged. In the initial stage of charge, lithium is absorbed in the first anode active material layer 22. That is, the anode active material included in the first anode active material layer 22 forms an alloy or a compound with lithium ions transferred from the cathode layer 10. When the all-solid-state secondary battery 1 is charged to exceed the charge capacity of the first anode active material layer 22, lithium is deposited on the rear surface of the first anode active material layer 22, that is, between the anode current collector 21 and the first anode active material layer 22, and a material corresponding to the second anode active material layer 23 is formed by the deposited lithium. The second negative electrode active material layer 23 is a metal layer mainly including lithium (that is, lithium metal). This result is obtained because the anode active material included in the first anode active material layer 22 includes a material forming an alloy or a compound with lithium. During discharge, lithium in the first anode active material layer 22 and the second anode active material layer 23 (that is, the metal layer) are ionized to move toward the cathode layer 10. Therefore, it is possible to use lithium as the anode active material in the all-solid-state secondary battery 1. When the first anode active material layer 22 covers the second anode active material layer 23, the first anode active material layer 22 serves as a protective layer of the second anode active material layer 23, that is, the metal layer and serves to suppress the deposition growth of lithium dendrites. Accordingly, short circuit and capacity reduction of the all-solid-state battery 1 are suppressed, and as a result, cycle characteristics of the all-solid-state secondary battery 1 are improved. Further, when the second anode active material layer 23 is disposed during charge, after assembly of the all-solid-state secondary battery 1, the anode current collector 21, the first anode active material layer 22, and the area between the anode current collector 21 and the first anode active material layer 22 is a Li-free area, meaning not including a lithium (Li) metal or a lithium (Li) alloy in the initial state or discharged state of the all-solid-state secondary battery.

The all-solid-state secondary battery 1 has a structure in which the second anode active material layer 23 is disposed on the anode current collector 21 and the solid electrolyte layer 30 is directly disposed on the second anode active material layer 23. The second anode active material layer 23 is a lithium metal layer or a lithium alloy layer.

When the solid electrolyte layer 30 includes the sulfide-based solid electrolyte, a side reaction between the second anode active material layer 23 (lithium metal layer) and the solid electrolyte layer 30 is suppressed, and thus cycle characteristics of the all-solid-state secondary battery 1 are improved.

Solid Electrolyte Layer

Referring to FIGS. 7 to 9, the solid electrolyte layer 30 includes the solid electrolyte disposed between the anode layer 20 and the cathode layer 10.

The solid electrolyte layer may further include a commercially available sulfide-based solid electrolyte in addition to the solid electrolyte according to an embodiment. The solid electrolyte may further include $Li_2S$—$P_2S_5$, $Li_2S$—$P_2S_5$—LiX (X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S$, $Li_2S$—$P_2S_5$—$Z_mS_n$ (m and n are each a positive number and Z is Ge, Zn, Ga, or a combination thereof), $Li_2S$—$GeS_2$, $Li_2S$—$SiS_2$—$LiPO_4$, $Li_2S$—$SiS_2$-$Li_pMO_q$ (p and q are each a positive number and M is P, Si, Ge, B, Al, Ga, In, or a combination thereof), or a combination thereof. The sulfide-based solid electrolyte further included in the solid electrolyte layer is amorphous, crystalline, or a mixed state thereof.

A commercially available sulfide-based solid electrolyte may include an argyrodite type solid electrolyte represented by Formula 6.

$$Li_{12-n-x}AX_{6-x}Y'_x \quad \text{Formula 6}$$

In Formula 6, A is P, As, Ge, Ga, Sb, Si, Sn, Al, In, Ti, V, Nb, or Ta, X is S, Se, or Te, Y' is Cl, Br, I, F, CN, OCN, SCN, or $N_3$, and $0<x<2$, n is an oxidation number of A and $2 \le n \le 6$.

The argyrodite type solid electrolyte includes $Li_{7-x}PS_{6-x}Cl_x$ ($0<x<2$), $Li_{7-x}PS_{6-x}Br_x$ ($0<x<2$), $Li_{7-x}PS_{6-x}I_x$ ($0<x<2$), or a combination thereof. The argyrodite type solid electrolyte may include $Li_6PS_5Cl$, $Li_6PS_5Br$, $Li_6PS_5I$, or a combination thereof.

The solid electrolyte layer 30 further includes a binder. Examples of the binder included in the solid electrolyte layer 30 include, but are not limited to, styrene butadiene rubber (SBR), polytetrafluoroethylene, polyvinylidene fluoride, or polyethylene. Any suitable binder may be used. The binder of the solid electrolyte layer 30 may be the same as or different from the binder of the cathode active material layer 12 and the anode active material layer 22.

Cathode Layer

The cathode layer 10 includes a cathode current collector 11 and a cathode active material layer 12.

As the cathode current collector 11, a plate or foil including indium (In), copper (Cu), magnesium (Mg), stainless steel, titanium (Ti), iron (Fe), cobalt (Co), nickel (Ni), zinc (Zn), aluminum (A), germanium (Ge), lithium (Li), or an alloy thereof may be used. The cathode current collector 11 may be omitted.

The cathode active material layer 12 includes a cathode active material and a solid electrolyte. The solid electrolyte included in the cathode layer 10 is similar to or different from the solid electrolyte included in the solid electrolyte layer 30. For details of the solid electrolyte, refer to the solid electrolyte layer 30. According to an embodiment, the solid electrolyte contains a solid electrolyte according to the invention.

The cathode layer contains a cathode active material, and the cathode active material is a compound capable of reversibly absorbing and desorbing lithium ions. The compound includes a lithium transition metal oxide having a layered crystal structure, a lithium transition metal oxide having an olivine crystal structure, a lithium transition metal oxide having a spinel crystal structure, or a combination thereof. Examples of the cathode active material include, but are not limited to, lithium transition metal oxides such as lithium cobalt oxide (LCO), lithium nickel oxide, lithium nickel cobalt oxide, lithium nickel cobalt aluminum oxide (NCA), lithium nickel cobalt manganese oxide (NCM), lithium manganese oxide (lithium manganate), or lithium iron phosphate, nickel sulfide, copper sulfide, lithium sulfide, iron oxide, orvanadium oxide. Any suitable cathode active material may be used. The cathode active materials may be used alone or as a mixture of two or more thereof.

As the cathode active material, for example, a compound represented by one of Formulae of $Li_aA_{1-b}B'_bD_2$ (where, $0.90 \le a \le 1$ and $0 \le b \le 0.5$); $Li_aE_{1-b}B'_bO_{2-c}D_c$ (where, $0.90 \le a \le 1$, $0 \le b \le 0.5$, and $0 \le c \le 0.05$); $LiE_{2-b}B'_bO_{4-c}D_c$ (where, $0 \le b \le 0.5$ and $0 \le c \le 0.05$); $Li_aNi_{1-a-c}Co_bB'_cD_\alpha$ (where, $0.90 \le a \le 1$, $0 \le b \le 0.5$, $0 \le c \cdot 0.05$, and $0 < \alpha \le 2$); $Li_aNi_{1-b-c}Co_bB'_cO_{2-\alpha}F'_\alpha$ (where, $0.90 \le a \le 1$, $0 \le b \le 0.5$, $0 \le c \le 0.05$, and $0 < \alpha < 2$); $Li_aNi_{1-b-c}Co_bB'_cO_{2-\alpha}F'_2$ (where, $0.90 \le a \le 1$, $0 \le b \ge 0.5$, $0 \le c \le 0.05$, and $0 < \alpha < 2$); $Li_aNi_{1-b-c}Mn_bB'_cD_\alpha$ (where, $0.90 \le a \le 1$, $0 \le b \ge 0.5$, $0 \le c \le 0.05$, and $0 < \alpha \le 2$); $Li_aNi_{1-b-c}Mn_bB'_cO_{2-\alpha}F'_\alpha$ (where, $0.90 \le a \le 1$, $0 \le b \le 0.5$, $0 \le c \le 0.05$, and $0 < \alpha < 2$); $Li_aNi_{1-b-c}Mn_bB'_cO_{2-\alpha}F'_2$ (where, $0.90 \le a \le 1$, $0 \le b \le 0.5$, $0 \le c \le 0.05$, and $0 < \alpha < 2$); $Li_aN$-$i_bE_cG_dO_2$ (where, $0.90 \le a \le 1$, $0 \le b \le 0.9$, $0 \le c \le 0.5$, and $0.001 \le d \le 0.1$); $Li_aNi_bCo_cMn_dGeO_2$ (where, $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where, $0.90 \le a \le 1$ and $0.001 \le b \le 0.1$); $Li_aCoG_bO_2$ (where, $0.90 \le a \ge 1$ and $0.001 \ge b \ge 0.1$); $Li_aMnG_bO_2$ (where, $0.90 \le a \le 1$ and $0.001 \le b \le 0.1$); $Li_aMn_2G_bO_4$ (where, $0.90 \le a \le 1$ and $0.001 \ge b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); or $LiFePO_4$ may be used. In these compounds, A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. In an embodiment, a compound having a coating layer on the surface of the compound may be used, or a mixture of the compound and a compound having a coating layer may be used. The coating layer formed on the surface of the compound may include a coating element compound of an oxide of a coating element, a hydroxide of a coating element, an oxyhydroxide of a coating element, an oxycarbonate of a coating element, or a hydroxycarbonate of a coating element. The compound constituting the coating layer may be amorphous or crystalline.

The coating layer may include Mg, Al, Co, K, Na, Ca, Si, Ti, V, Sn, Ge, Ga, B, As, Zr, or a mixture thereof as the coating element. The method of forming the coating layer is selected within the range that does not adversely influence the physical properties of the cathode active material. The coating method is, for example, spray coating or dipping. Any suitable coating method may be used.

The positive electrode active material includes a lithium salt of a transition metal oxide having a layered rock salt type structure. The "layered rock salt type structure" refers to a structure in which oxygen atom layers and metal atom layers are alternately and regularly arranged in the <111> direction of a cubic rock salt type structure and thus each of the atom layers forms a two-dimensional plane. The "cubic rock salt type structure" refers to a sodium chloride (NaCl) type structure, which is a type of crystal structure, and more specifically, in which face centered cubic lattices (FCCs), which form cations and anions, respectively, are arranged having the unit lattice offset by one-half of the ridge of the unit lattice. The lithium transition metal oxide having such layered rock salt structure is a ternary lithium transition metal oxide such as $LiNi_xCo_yAl_zO_2$ (NCA) or $LiNi_xCo_yMn_zO_2$ (NCM) ($0<x<1$, $0<y<1$, $0<z<1$, $(x+y+z)=1$). When the cathode active material includes a ternary lithium transition metal oxide having the layered rock salt structure, the energy density and thermal stability of the all-solid-state secondary battery 1 are improved.

The cathode active material may be covered by the coating layer as described. The coating layer may be any suitable coating layer for the cathode active material of the all-solid-state secondary battery. The coating layer is, for example, $Li_2O$—$ZrO_2$ (LZO).

When the cathode active material contains nickel (Ni) as the ternary lithium transition metal oxide such as NCA or NCM, the capacity density of the all-solid secondary battery 1 is increased. As a result, the cycle characteristics of the all-solid secondary battery 1 are improved.

The cathode active material is in the form of a particle with a true sphereshape or an elliptical shape. The particle diameter of the cathode active material is not limited, and is in a suitable range in the cathode active material of the all-solid secondary battery. The content of the cathode active material of the cathode layer is also not limited, and is in a suitable range in the cathode layer of the all-solid secondary battery.

The cathode layer 10 may further include additives such as a conductive material, a binder, a filler, a dispersant, or an ion conducting agent, in addition to the cathode active material and solid electrolyte. Examples of the conductive material include graphite, carbon black, acetylene black, ketjen black, carbon fiber, or metal powder. Examples of the binder include styrene butadiene rubber (SBR), polytetrafluoroethylene, polyvinylidene fluoride, or polyethylene. The filler, the dispersant, and the ion conducting agent may be included in the cathode active material layer, and may be any suitable materials for use in an electrode of the all-solid secondary battery.

A method of preparing a solid electrolyte according to another embodiment includes: providing a precursor mixture including a phosphorus (P) precursor, a sulfur (S) precursor, a bromine (Br) precursor, and an X precursor; and reacting the precursor mixture to prepare the solid electrolyte. The phosphorus precursor is a compound containing phosphorus, and examples thereof include $P_2S_5$, red phosphorous, or white phosphorous. The sulfur precursor is a compound containing sulfur, or a compound containing sulfur and lithium and an example thereof includes $Li_2S$.

In the X precursor, X is chlorine (Cl), iodine (I), or a combination thereof. The X precursor is a compound containing X and lithium, and an example thereof includes a lithium halide. The lithium halide is, for example, LiCl, LiI, or a combination thereof.

The bromine precursor is a compound containing bromine and lithium, and an example thereof includes LiBr.

An M precursor may be further added to the precursor mixture. In the M precursor, M is sodium (Na), potassium (K), iron (Fe), magnesium (Mg), calcium (Ca), silver (Ag), copper (Cu), zirconium (Zr), zinc (Zn), or a combination thereof. The M precursor is a compound containing M and sulfur. Examples of the M precursor include $Na_2S$ or $K_2S$.

The step of contacting the precursor mixture to prepare the solid electrolyte may further comprise, for example, contacting the precursor mixture to form a solid electrolyte precursor, and heat-treating the solid electrolyte precursor at a temperature from about 200° C. to about 1000° C., for example, a temperature from about 350° C. to about 550° C.

The method of reacting the precursor mixture is not limited, but an example thereof includes mechanical milling (MM). For example, when mechanical milling is used, the solid electrolyte precursor is prepared by stirring and reacting starting materials such as $Li_2S$ or $P_2S_5$ using a ball mill. Although the stirring speed and stirring time of mechanical milling are not limited, the faster the stirring speed, the faster the production rate of the solid electrolyte precursor, and the longer the stirring time, the higher the conversion rate of the raw material into the solid electrolyte precursor.

Subsequently, the solid electrolyte precursor obtained by mechanical milling is heat-treated at predetermined temperature, and then pulverized to prepare a particulate solid electrolyte. When the solid electrolyte has glass transition characteristics, the solid electrolyte may be changed from amorphous to crystalline. The heat-treatment temperature is, for example, about 200° C. to about 1000° C., about 250 to about 750° C., or about 350° C. to about 550° C. When the heat-treating is carried out within these temperature ranges, a solid electrolyte having a uniform composition is formed.

The heat-treatment time is selected based on the heat-treatment temperature, for example about 1 to about 100 hours, about 10 to about 80 hours, about 10 to about 50 hours, about 10 to about 30 hours, or about 10 hours to about 20 hours. The solid electrolyte formed by heat-treating for a time within these ranges has both excellent ionic conductivity and high-temperature stability.

The heat-treatment atmosphere is an inert atmosphere. Gas used in the heat treatment atmosphere is not limited to nitrogen or argon, and may be any suitable inert atmosphere gas.

A method of manufacturing an all-solid-state secondary battery according to an embodiment includes: preparing a solid electrolyte using the foregoing method; forming a cathode layer 10, an anode layer 20, and/or a solid electrolyte layer 30 using the solid electrolyte; and laminating these layers.

The solid electrolyte layer 30 has a thickness of about 10 μm to about 200 μm.

Preparation of Anode Layer

An anode active material, a conductive material, a binder, and a solid electrolyte, which are included in a first anode active material layer 22, are added to a polar solvent or a nonpolar solvent to prepare a slurry. The prepared slurry is applied onto an anode current collector 21 and dried to prepare a first laminate. Subsequently, the first laminate is pressed to prepare an anode layer 20. The pressing may be, but is not necessarily limited to, roll pressing, flat pressing, or hot pressing. Any suitable method of pressing may be used. The pressing process may be omitted.

The anode layer includes an anode current collector and a first anode active material layer including an anode active material and disposed on the anode current collector. The anode active material includes a carbon anode active material, a metal-based anode active material, a metalloid anode active material, or a combination thereof.

The carbon anode active material includes amorphous carbon, crystalline carbon, or a combination thereof. The metal anode active material or metalloid anode active material includes gold (Au), platinum (Pt), palladium (Pd), silicon (Si), silver (Ag), aluminum (Al), bismuth (Bi), tin (Sn), zinc (Zn), or a combination thereof.

The anode layer further includes a second anode active material layer disposed between the anode current collector and the first anode active material layer and/or between the solid electrolyte layer and the first anode active material layer, and the second anode active material layer is a metal layer including lithium or a lithium alloy.

Preparation of Cathode Layer

A cathode active material, a conductive material, a binder, and a solid electrolyte, which are included in a cathode active material layer 12, are added to a nonpolar solvent to prepare a slurry. The prepared slurry is applied onto a cathode current collector 11 and dried to obtain a laminate. The obtained laminate is pressed to prepare a cathode layer 10. The pressing may be, but is not necessarily limited to, roll pressing, flat pressing, or hot pressing. Any suitable pressing method may be used. The pressing process may be omitted. Alternatively, the cathode layer 10 is prepared by compacting a mixture of materials constituting the cathode active material layer 12 into pellets or by stretching (extruding) the mixture into sheets. When the cathode layer 10 is prepared by this this method, the cathode current collector 11 may be omitted.

Preparation of Solid Electrolyte Layer

A solid electrolyte layer 30 is formed of a solid electrolyte including the solid electrolyte material. For example, the solid electrolyte layer 30 is prepared by applying a mixture of a solid electrolyte, a solvent, and a binder, and drying and pressing the mixture. Alternatively, the solid electrolyte layer 30 is prepared by depositing a solid electrolyte obtained by the foregoing preparation method using a suitable film forming method such as aerosol deposition, cold spraying, or sputtering. Alternatively, the solid electrolyte layer 30 is prepared by pressing solid electrolyte particles to form a film.

Manufacture of all-Solid-State Secondary Battery

The cathode layer 10, the anode layer 20, and the solid electrolyte layer 30, which are prepared by the foregoing methods, are laminated such that the solid electrolyte 30 is provided between the cathode layer 10 and the anode layer 20, and are pressed to manufacture an all-solid-state secondary battery 1.

For example, the solid electrolyte layer 30 is disposed on the cathode layer 10 to prepare a second laminate. Subsequently, the anode layer 20 is disposed on the second laminate such that the solid electrolyte layer 30 contacts the first anode active material layer to prepare a third laminate, and the third laminate is pressed to manufacture the all-solid-state secondary battery 1. The pressing is performed at room temperature (about 20° C. to about 25° C.) to at a temperature of 90° C. Alternatively, the pressing is performed at a high temperature of 100° C. or more. The pressing time is, for example, about 30 minutes (min) or less, about 20 minutes or less, about 15 minutes or less, or about 10 minutes or less. The pressing time is about 1 millisecond (ms) to about 30 min, about 1 ms to about 20 min, about 1 ms to about 15 min, or about 1 ms to about 10 min. Examples of the pressing include, but are not limited to, isotactic pressing, roll pressing, or flat pressing. Any suitable pressing may be used. Pressure applied during the pressing is, for example, about 500 megapascals (MPa) or less, about 400 MPa or less, about 300 MPa or less, about 200 MPa or less, or about 100 MPa or less. Pressure applied during the pressing is, for example, about 50 MPa to about 500 MPa, about 52 MPa to about 480 MPa, about 54 MPa to about 450 MPa, about 56 MPa to about 400 MPa, about 58 MPa to about 350 MPa, about 60 MPa to about 300 MPa, about 62 MPa to about 250 MPa, about 64 MPa to about 200 MPa, about 66 MPa to about 150 MPa, or about 68 MPa to about 100 MPa. The solid electrolyte powder is sintered by the pressing to form one solid electrolyte layer.

The configuration and manufacturing method of the foregoing all-solid-state secondary battery are exemplary embodiments, and the structural members, manufacturing processes, and the like thereof may be changed as appropriate.

Hereinafter, methods of preparing a solid electrolyte according to embodiments will be described in further detail with reference Examples and Comparative Examples. In addition, the following Examples are provided for the purpose of illustration only, and the present disclosure is not limited to these Examples.

EXAMPLES

Preparation of Solid Electrolyte

Example 1

After weighing $Li_2S$, $Na_2S$, $P_2S_5$, LiCl and LiBr to a target composition of $(Li_{5.45}Na_{0.05})PS_{4.5}Cl_{0.25}Br_{1.25}$, a mechanical milling process was performed for 20 hours in a ball mill using a high energy mill (Pulnerisette 7) to mix the components. The mechanical milling process was performed for 20 hours at a rotational speed of 380 rpm, at room temperature, and under an argon atmosphere.

300 mg of the powder material of the composition $(Li_{5.45}Na_{0.05})PS_{4.5}Cl_{0.25}Br_{1.25}$ obtained from the mechanical milling process was heat-treated at 450° C. for 12 hours in a vacuum atmosphere to obtain a solid electrolyte.

Examples 2 and 3

Solid electrolytes were prepared in the same manner as in Example 1, except that the contents of $Li_2S$, $P_2S_5$, LiCl, and LiBr were selected to target compositions $Li_{5.5}PS_{4.5}Cl_{0.25}Br_{1.25}$ and $Li_{5.5}PS_{4.5}Cl_{0.1}Br_{1.4}$, respectively, without using $Na_2S$ as a starting material.

Examples 4 and 5

Solid electrolytes were prepared in the same manner as in Example 1, except that the contents of $Li_2S$, $Na_2S$, $P_2S_5$, LiCl, and LiBr were selected to target compositions $Li_{5.45}Na_{0.05}PS_{4.5}Cl_{0.1}Br_{1.4}$ and $Li_{5.45}Na_{0.05}PS_{4.5}Cl_{0.25}Br_{1.25}$, respectively, and heat treatment temperature was changed from 450° C. to 400° C.

Example 5A

Solid electrolytes were prepared in the same manner as in Example 1, except that the contents of $Li_2S$, $Na_2S$, $P_2S_5$, LiCl, and LiBr were selected to obtain solid electrolytes having the compositions shown in Table 1.

TABLE 1

| Example | Solid electrolyte |
| --- | --- |
| 5A-1 | $Li_{4.95}Na_{0.05}PS_4Cl_{0.01}Br_{1.99}$ |
| 5A-2 | $Li_{5.74}PS_{4.74}Cl_{0.01}Br_{1.25}$ |
| 5A-3 | $Li_{5.45}K_{0.05}PS_{4.5}Cl_{0.25}Br_{1.25}$ |
| 5A-4 | $Li_{5.45}K_{0.05}PS_{4.5}Cl_{0.1}Br_{1.4}$ |

Comparative Examples 1 to 7

Solid electrolytes were prepared in the same manner as in Example 1, except that the contents of $Li_2S$, $Na_2S$, $P_2S_5$, LiCl, and LiBr were selected to obtain solid electrolytes having the compositions shown in Table 2.

TABLE 2

| Example | Solid electrolyte |
|---|---|
| Comparative Example 1 | $Li_{5.45}Na_{0.05}PS_{4.5}Cl_{1.5}$ |
| Comparative Example 2 | $Li_{5.45}Na_{0.05}PS_{4.5}Cl_{1.25}Br_{0.25}$ |
| Comparative Example 3 | $Li_{5.45}Na_{0.05}PS_{4.5}Cl_{1}Br_{0.5}$ |
| Comparative Example 4 | $Li_{5.45}Na_{0.05}PS_{4.5}Cl_{0.75}Br_{0.75}$ |
| Comparative Example 5 | $Li_{5.45}Na_{0.05}PS_{4.5}Cl_{0.5}Br_{1}$ |
| Comparative Example 6 | $(Li_{5.6925}Na_{0.0575})PS_{4.75}Cl_{1.25}$ |
| Comparative Example 7 | $Li_{5.75}PS_{4.75}Cl_{1.25}$ |
| Comparative Example 7A | $(Li_{5.45}Na_{0.05})PS_{4.5}Cl_{0.25}Br_{1.25}$ |

Preparation Example 1

A cathode active material having an $aLi_2O$—$ZrO_2$ coating film was prepared according to the method disclosed in Korean Patent Publication No. 10-2016-0064942, the content of which is incorporated herein in its entirety by reference, and was prepared according to the following method.

Cathode active material $LiNi_{0.8}Co_{0.15}Mn_{0.05}O_2$(NCM), lithium methoxide, zirconium propoxide, ethanol, and ethyl acetoacetate were stirred and mixed for 30 minutes to prepare an alcohol solution of $aLi_2O$—$ZrO_2$ (a=1) (a coating solution for $aLi_2O$—$ZrO_2$). The content of lithium methoxide and zirconium propoxide was adjusted such that the content of $aLi_2O$—$ZrO_2$ (a=1) applied on the surface of a cathode active material was 0.5 mol %.

Next, the coating solution for $aLi_2O$—$ZrO_2$ was mixed with the cathode active material to obtain a mixed solution, and the mixed solution was heated to about 40° C. while stirring the mixed solution to evaporate and dry a solvent such as alcohol. The mixed solution was irradiated with ultrasonic waves.

In this process, a precursor of $aLi_2O$—$ZrO_2$ may be supported on the surface of a particle of the cathode active material.

The precursor of $aLi_2O$—$ZrO_2$ supported on the surface of a particle of the cathode active material fine powder was heat-treated at about 350° C. for 1 hour under an oxygen atmosphere. During this heat treatment process, the precursor of $aLi_2O$—$ZrO_2$ existing on the cathode active material was changed into $aLi_2O$—$ZrO_2$(a=1). The content of $Li_2O$—$ZrO_2$ (LZO) is about 0.4 parts by weight, based on 100 parts by weight of $LiNi_{0.8}Co_{0.15}Mn_{0.05}O_2$ (NCM).

According to the aforementioned preparation process, $LiNi_{0.8}Co_{0.15}Mn_{0.05}O_2$ (NCM) having an $aLi_2O$—$ZrO_2$ coating film was obtained. In $aLi_2O$—$ZrO_2$, a is 1.

Manufacture of all-Solid-State Secondary Battery

Example 6

Preparation of Cathode Layer

As a cathode active material $LiNi_{0.8}Co_{0.15}Mn_{0.05}O_2$ (NCM) coated with $Li_2O$—$ZrO_2$ (LZO) was obtained according to Preparation Example 1.

As a solid electrolyte, solid electrolyte powder prepared in Example 1 was prepared. As a binder, a polytetrafluoroethylene (PTFE) binder (Teflon binder made by DuPont Corporation) was provided. As a conductive material, carbon nanofibers (CNF) were provided. These materials were mixed at a weight ratio of cathode active material to solid electrolyte to conductive material to binder of 84.2:11.5:2.9:1.4 to obtain a mixture, and the mixture was molded in the form of a sheet to prepare a cathode sheet. The prepared cathode sheet was pressed on a cathode current collector formed of a carbon-coated aluminum foil having a thickness of 18 μm to prepare a cathode layer. The thickness of the cathode active material layer included in the cathode layer was 100 μm.

Anode Layer

As an anode layer, a lithium metal layer having a thickness of about 30 μm was used.

Solid Electrolyte Layer 1 part by weight of styrene-butadiene rubber (SBR) was added to 100 parts by weight of a crystalline argyrodite-based solid electrolyte ($Li_6PS_5Cl$) to prepare a mixture. Xylene and diethyl benzene were added to the mixture, and stirred to prepare a slurry. The prepared slurry was applied onto a nonwoven fabric using a blade coater, and was dried in air at 40° C. to obtain a laminate. The obtained laminate was dried in vacuum at 40° C. for 12 hours. The solid electrolyte layer was thus obtained.

Manufacture of all-Solid-State Secondary Battery

A solid electrolyte layer was disposed on an anode layer, and a cathode layer was disposed on the solid electrolyte layer to prepare a laminate. The prepared laminate was plate-pressed by a pressure of 100 MPa at 25° C. for 10 minutes to manufacture an all-solid-state secondary battery. The solid electrolyte layer was sintered during the press process to improve battery characteristics.

Examples 7 to 10

All-solid-state secondary batteries were manufactured in the same manner as in Example 5, except that in the cathode layer, the solid electrolyte prepared in Example 1 was changed to the solid electrolytes prepared in Examples 2 to 5.

Examples 11 to 14

All-solid-state secondary batteries were manufactured in the same manner as in Example 5, except that in the cathode layer, the solid electrolyte prepared in Example 1 was changed to the solid electrolytes prepared in Examples 5A-1 to 5A-4.

Comparative Examples 8 to 14

All-solid-state secondary batteries were manufactured in the same manner as in Example 5, except that in the cathode layer, the solid electrolyte prepared in Example 1 was changed to the solid electrolytes prepared in Comparative Examples 1 to 7.

Evaluation Example 1: Measurement of Ionic Conductivity

A powder of each of the solid electrolytes prepared in Examples 1 to 5 was put into a mold having a diameter of 10 mm, and pressed at a pressure of 350 MPa to form a pellet. Both surfaces of the pellet were coated with an indium (In) thin film to prepare a sample for measuring ionic conductivity. Impedance of the prepared sample was measured using a potentiostat (AUTOLAB PGSTAT30, manufactured by Metrohm Autolab Co. Ltd.) to draw a Nyquist plot, and ionic conductivity at 25° C. was measured from the Nyquist plot.

The measured ionic conductivity is shown in Table 3.

TABLE 3

| Example | Ionic conductivity (mS/cm) |
| --- | --- |
| Example 1 | 3.9 |
| Example 2 | 3.7 |
| Example 3 | 4.1 |
| Example 4 | 3.6 |
| Example 5 | 3.4 |

As shown in Table 3, each of the solid electrolytes prepared in Examples 1 to 5 has excellent ionic conductivity of 1 mS/cm or more.

Evaluation Example 2: XRD Analysis

Figure 1B:
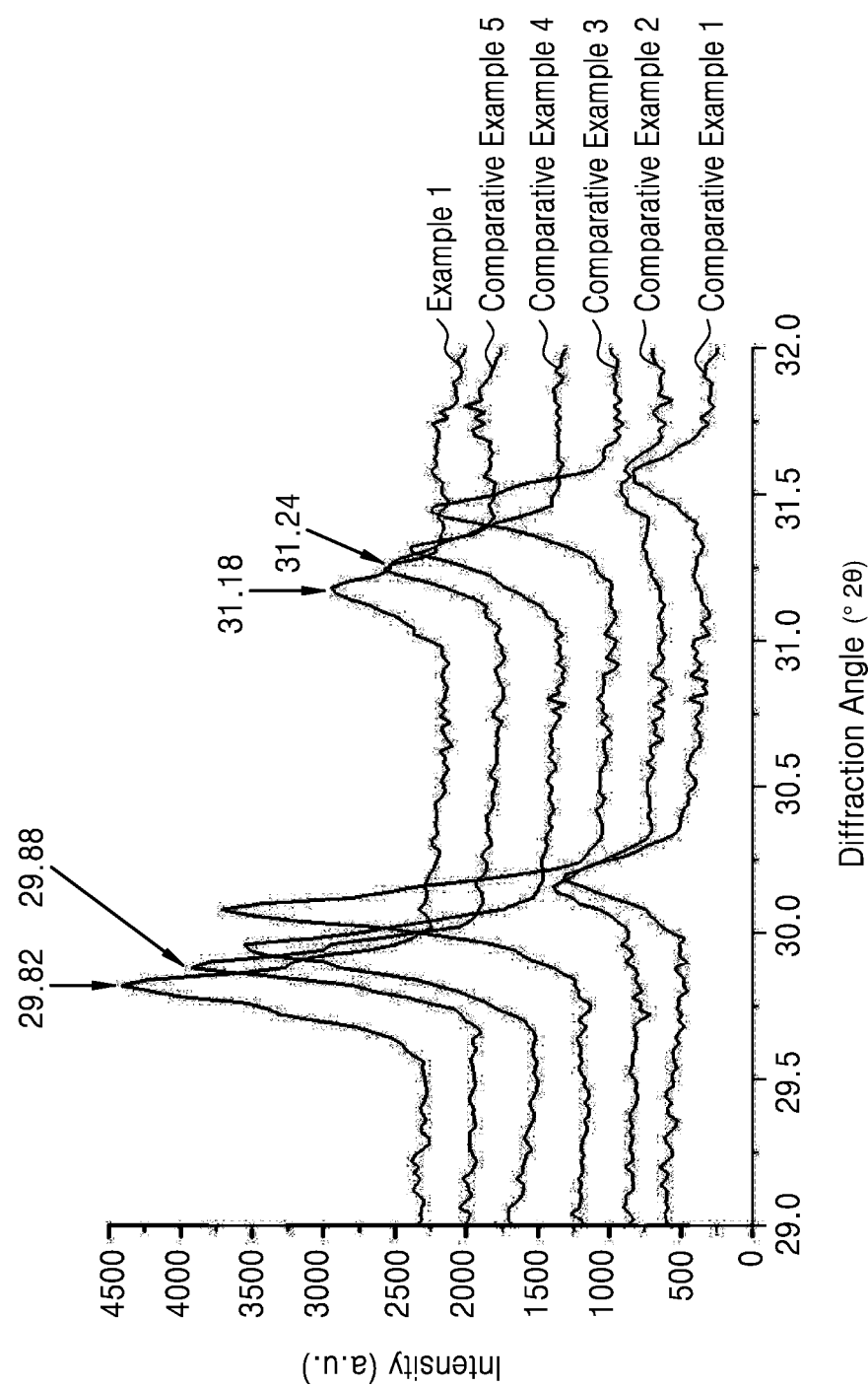
FIGS. 1B and 1C are each an enlarged view of portions of FIG. 1A.
Figure 1C:
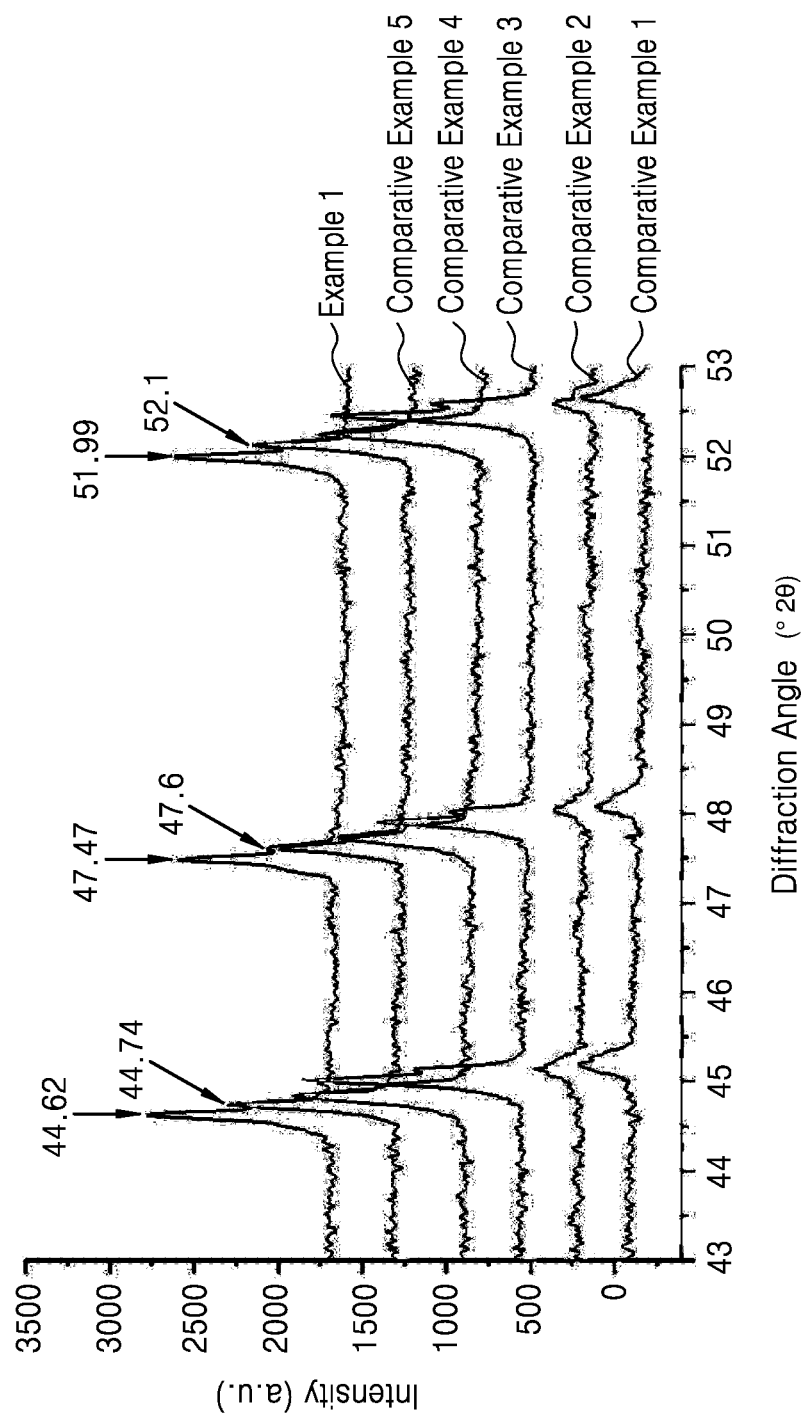

XRD spectra of the solid electrolytes prepared in Example 1 and Comparative Examples 1-5 were measured, and the results thereof are shown in FIGS. 1A to 1C. FIGS. 1B and 1C are enlarged views of portions of FIG. 1A.

Referring to FIG. 1A, it may be found that the solid electrolytes of Example 1 has an argyrodite crystal structure similarly to those of Comparative Example 1. However, as shown in FIGS. 1B and 1C, in the XRD spectra of the solid electrolytes of Example 1, a first peak at 29.82°2θ, corresponding to (311) crystal plane and a second peak at 31.18°2θ, corresponding to (222) crystal plane are present. Peak shifts of the first peak and the second peak were observed at about 0.06° to about 0.48° toward low angles as compared with peaks corresponding to the solid electrolytes of Comparative Examples 1 to 5.

Further, in the XRD spectra of the solid electrolytes of Example 1, a third peak at 44.62°2θ corresponding to (422) crystal plane, a fourth peak at 47.47°2θ corresponding to (511) crystal plane, and a fifth peak at 51.99°2θ corresponding to (440) crystal plane are present. Peak shifts of the third peak, fourth peak, and the fifth peak were observed at about 0.11°2θ to about 0.4°2θ toward low angles as compared with peaks corresponding to the solid electrolytes of Comparative Examples 1 to 5.

Evaluation Example 3: Evaluation of High-Voltage Stability

Charge and discharge characteristics of the all-solid-state second batteries of Examples 6 to 10 using the solid electrolytes of Examples 1 to 5 and the all-solid-state second batteries of Comparative Examples 8 to 12 using the solid electrolytes of Comparative Examples 1 to 5 were evaluated by a charge-discharge test. The battery was charged for about 10 hours with a constant current of 0.1 C until the battery voltage was 4.25 V, and was charged at a constant voltage of 4.25 V until the current was 0.05 C, and was then rested for 10 minutes. Then, the battery was discharged for about 10 hours with a constant current of 0.1 C until the battery voltage was 2.5 V, and was rested for 10 minutes. This process is referred to as the "first cycle."

Subsequently, the battery was charged for about 10 hours with a constant current of 0.1 C until the battery voltage was 4.25 V, and was tested at 45° C. for about 40 hours, and was then rested for 10 minutes. Then, the battery was discharged for about 10 hours with a constant current of 0.1 C until the battery voltage was 2.5 V, and was rested for 10 minutes. This process is referred to as the "second cycle."

Thereafter, the battery was charged for about 10 hours with a constant current of 0.1 C until the battery voltage was 4.25 V, and was charged at a constant voltage of 4.25 V until the current was 0.05 C, and was then rested for 10 minutes. Then, the battery was discharged for about 10 hours with a constant current of 0.1 C until the battery voltage was 2.5 V, and was rested for 10 minutes. This process is referred to as the "third cycle." The capacity retention is calculated by Equation 1, and is shown in Table 4 and FIG. 2.

Figure 2:
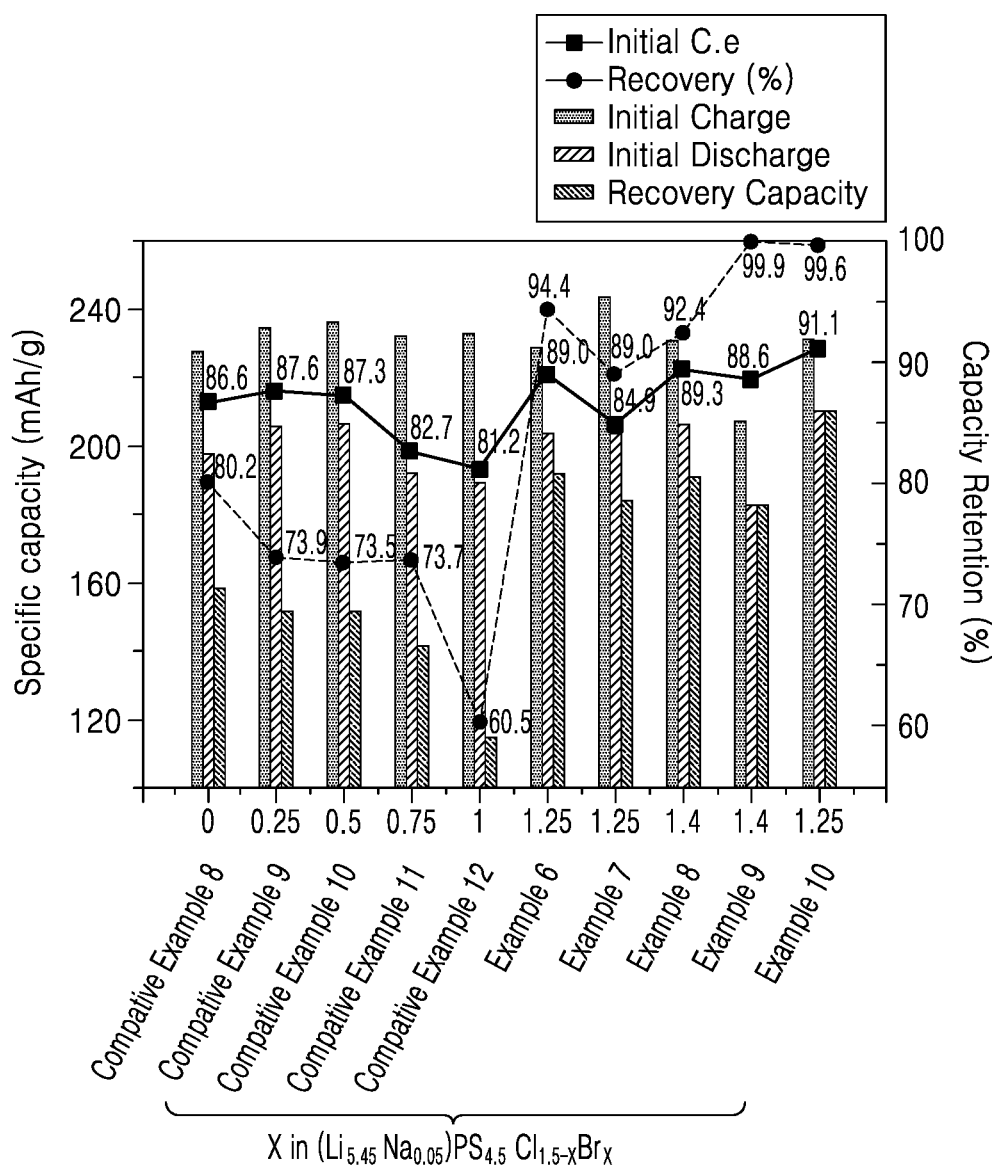
FIG. 2 is a graph of specific capacity (milliampere hours per gram (mAh/g)) and capacity retention (%) versus x in $(Li_{5.45}Na_{0.05})PS_{4.5}Cl_{1.5-x}Br_x$, showing the charge and discharge characteristics of the all-solid-state secondary batteries of Examples 6 to 10 and the all-solid-state secondary batteries of Comparative Examples 8 to 12.

In FIG. 2, "Initial C.e" refers to initial columbic efficiency.

$$\text{Capacity retention (\%)} = (\text{discharge capacity of 3rd cycle}/\text{discharge capacity of 1st cycle}) \times 100\% \quad \text{Equation 1}$$

TABLE 4

| Example | Capacity retention (%) |
| --- | --- |
| Example 6 | 94.4 |
| Example 7 | 89.0 |
| Example 8 | 92.4 |
| Example 9 | 99.9 |
| Example 10 | 99.6 |
| Comparative Example 8 | 80.2 |
| Comparative Example 9 | 73.9 |
| Comparative Example 10 | 73.5 |
| Comparative Example 11 | 73.7 |
| Comparative Example 12 | 60.5 |

As shown in Table 4, it may be found that capacity retention of the all-solid-state secondary batteries of Examples 6 to 10 are remarkably improved as compared with those of the all-solid-state secondary batteries of Comparative Examples 8 to 12. From the results, it may be found that oxidation stability of the solid electrolytes used in the all-solid-state secondary batteries of Examples 6 to 10 is remarkably improved as compared with oxidation stability of the solid electrolytes used in the all-solid-state secondary batteries of Comparative Examples 8 to 12.

Evaluation Example 4: Evaluation of Cycle Characteristics and High-Voltage Stability Charge and discharge characteristics of the all-solid-state second batteries manufactured in Example 10 and Comparative Example 13 were evaluated by the following charge-discharge test. An evaluation of cycle characteristics proceeded in the same manner as in the high-voltage stability evaluation up to the third cycle. A "fourth cycle" was carried out as follows. The battery was charged for about 3 hours with a constant current of 0.33 C until the battery voltage was 4.25 V, and was charged at a constant voltage of 4.25 V until the current was 0.1 C, and was then rested for 10 minutes. Then, the battery was discharged for about 3 hours with a constant current of 0.33 C until the battery voltage was 2.5 V, and was rested for 10 minutes.

Figure 3:
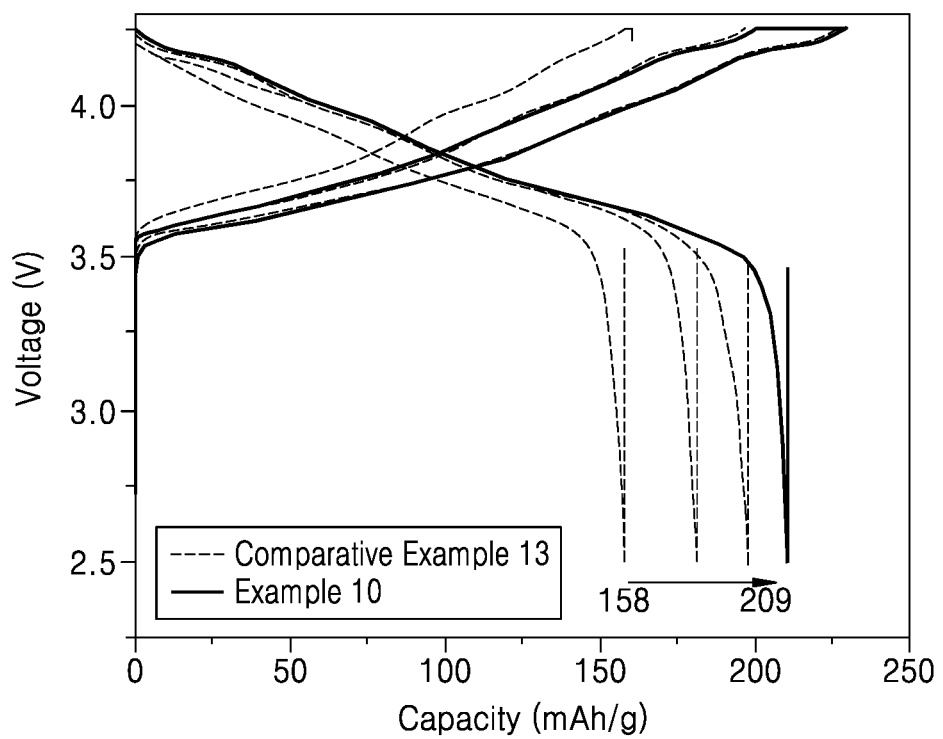
FIG. 3 is a graph of voltage (V) versus capacity (mAh/g) that shows the charge and discharge characteristics of all-solid-state secondary batteries of Example 10 and Comparative Example 13.

Thereafter, charge and discharge proceeded in the same manner as in the fourth cycle, and cycle characteristics were evaluated. In FIG. 3. Initial charge and discharge is for the first cycle, and recovery capacity is the discharge value in third cycle.

Charge-discharge profiles of the all-solid-state batteries of Example 10 and Comparative Example 13 are shown in FIG. 3.

As shown in FIG. 3, it may be found that charge and discharge reversibly proceeded in the all-solid-state secondary battery of Example 10, which allowed for increased capacity retention, improved cycle characteristics, and improved high-voltage stability compared to the all-solid-state secondary battery of Comparative Example 13.

Figure 4:
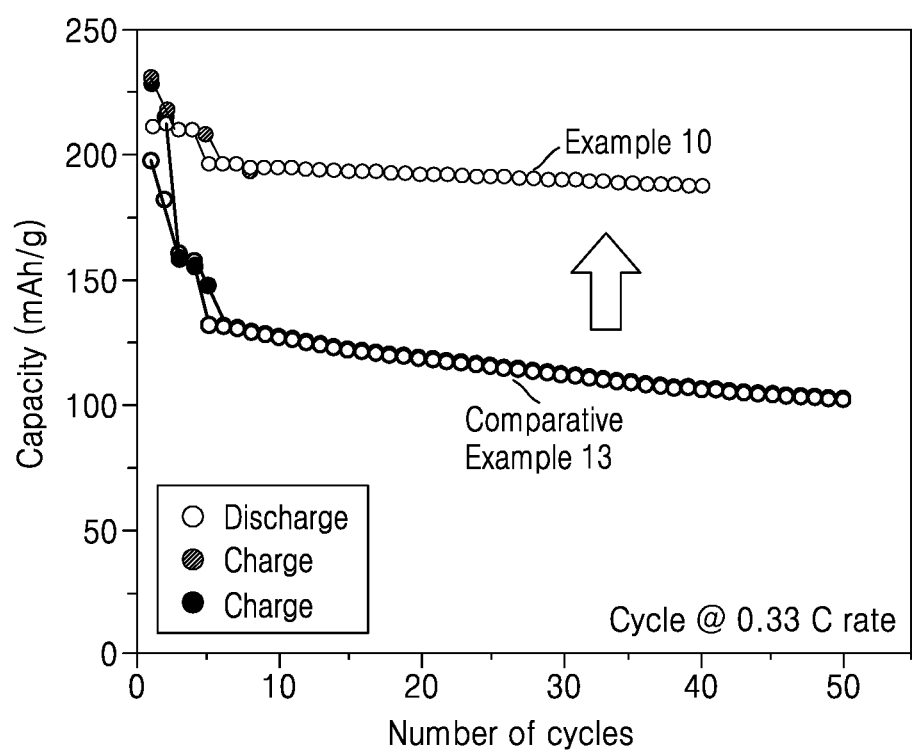
FIG. 4 is a graph of capacity (mAh/g) vs number of cycles that shows the cycle characteristics of the all-solid-state secondary batteries of Example 10 and Comparative Example 13.

Discharge capacity changes of the all-solid-state batteries of Example 10 and Comparative Example 13 according to the cycle number is shown in FIG. 4.

As shown in FIG. 4, it may be found that in the all-solid-state secondary battery of Example 10, unlike the all-solid-state secondary battery of Comparative Example 13, had improved cycle characteristics.

Evaluation Example 5: Evaluation of High-Voltage Stability and Cycle Characteristics Charge and discharge characteristics of the all-solid-state second battery of Example 10 using the solid electrolyte of Example 5 and the all-solid-state second battery of Comparative Example 14 using the solid electrolyte of Comparative Example 7 were evaluated by the following charge-discharge test. The battery was charged for about 10 hours with a constant current of 0.1 C until the battery voltage was 4.25 V, and was charged at a constant voltage of 4.25 V until the current was 0.05 C, and was then rested for 10 minutes. Then, the battery was discharged for about 20 hours with a constant current of 0.05 C until the battery voltage was 2.5 V, and was rested for 10 minutes ("first cycle").

Subsequently, the battery was charged for about 10 hours with a constant current of 0.1 C until the battery voltage was 4.25 V, and was then left at 60° C. for about 7 days. Subsequently, the battery was discharged for about 20 hours with a constant current of 0.05 C until the battery voltage was 2.5 V ("second cycle").

Thereafter, the battery was charged for about 10 hours with a constant current of 0.1 C until the battery voltage was 4.25 V, was charged at a constant voltage of 4.25 V until the current was 0.05 C, and was then rested for 10 minutes. Then, the battery was discharged for about 20 hours with a constant current of 0.05 C until the battery voltage was 2.5 V ("third cycle").

Figure 5:
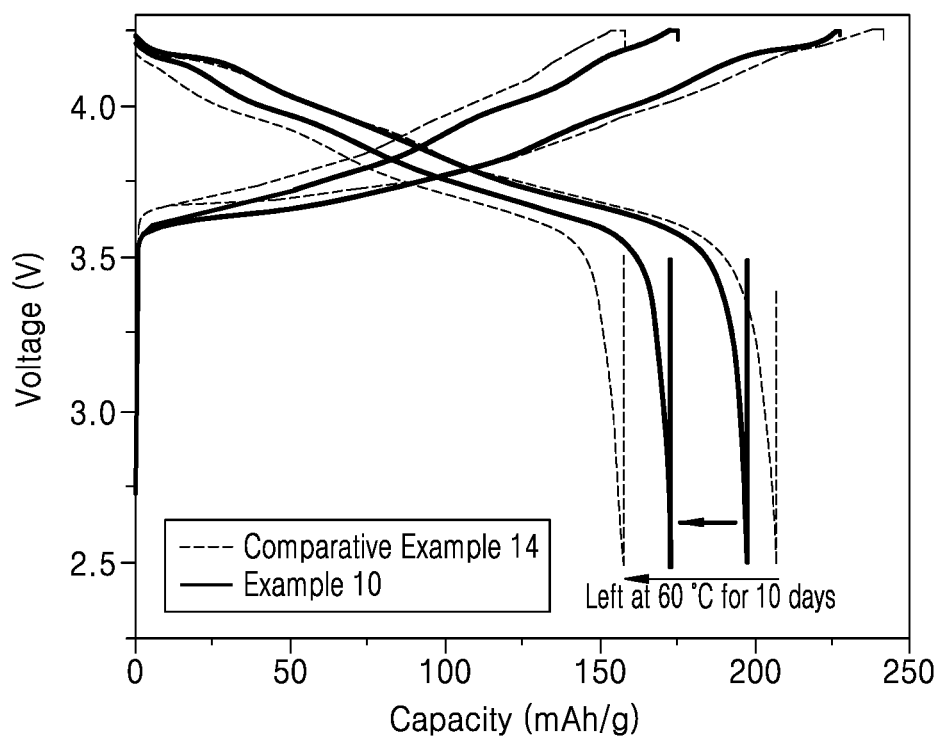
FIG. 5 is a graph of voltage (V) versus capacity (mAh/g) that shows the charge and discharge characteristics of all-solid-state batteries of Example 10 and Comparative Example 14.

The charge-discharge profiles of the all-solid-state batteries of Example 10 and Comparative Example 14 are shown in FIG. 5. The capacity retention is calculated by Equation 1, and is shown in FIG. 6.

Capacity retention (%)=(discharge capacity of 3rd cycle/discharge capacity of 1st cycle)×100%   Equation 1

Figure 6:
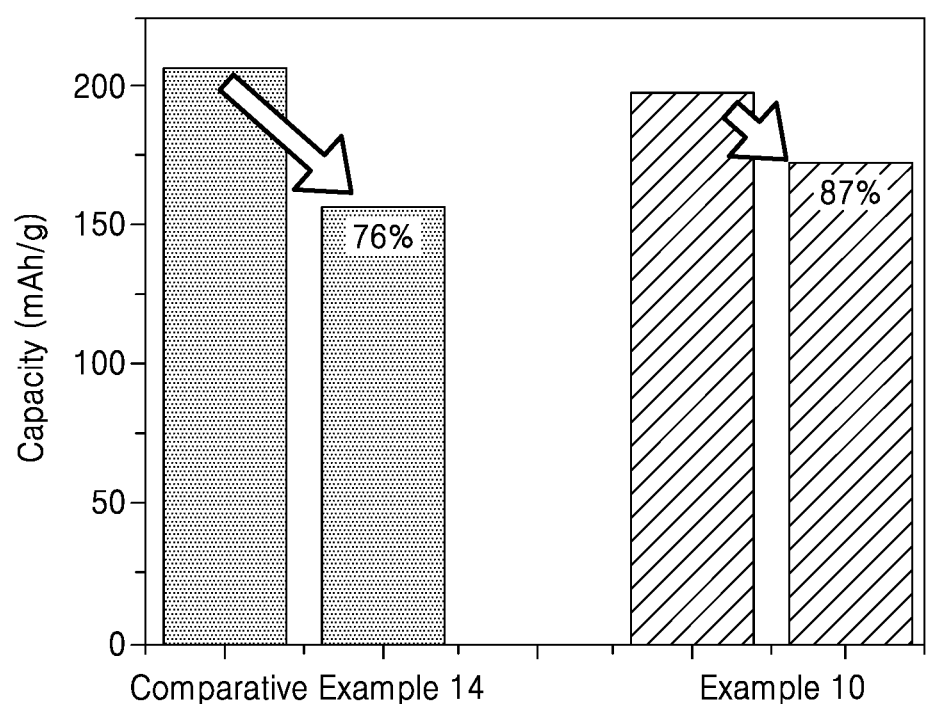
FIG. 6 shows the capacity retention of the all-solid-state secondary batteries of Example 10 and Comparative Example 14.

As shown in FIG. 6, in the all-solid-state secondary battery of Example 10, unlike the all-solid-state secondary battery of Comparative Example 14, charge and discharge reversibly proceeded during the first cycle and second cycle. Thus, it may be found that cycle characteristics were improved. Further, as shown in FIG. 6, the capacity retention of the all-solid-state secondary battery of Example 10 is 87%, which is higher than the 76% capacity retention of the all-solid-state secondary battery of Comparative Example 14. Thus, it may be found that high-voltage stability was improved.

Further, the high-voltage stability and cycle characteristics of the all-solid-state secondary batteries of Examples 11 to 17 were evaluated according to the same evaluation method as in the all-solid-state secondary battery of Example 10 using the solid electrolyte of Example 5.

As a result, it may be found that the all-solid-state secondary batteries of Examples 11 to 17 exhibit the same high-voltage oxidation stability as the all-solid-state secondary batteries of Example 10.

According to an aspect, a solid electrolyte having excellent ionic conductivity and improved high-voltage stability may be provided. When such a solid electrolyte is used, an electrochemical battery having improved capacity retention and cycle characteristics may be provided.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid electrolyte comprising:
a compound having an argyrodite crystal structure and represented by Formula 1

$$Li_a M_x PS_b Br_c X_d$$   Formula 1 wherein, in Formula 1,
M is Na, K, Fe, Mg, Ca, Ag, Cu, Zr, Zn, or a combination thereof;
X is Cl, I, or a combination thereof; and
$0<x<1$, $5<(a+x)<7$, $5\leq a\leq 6$, $4\leq b\leq 6$, $0<(c+d)\leq 2$, and $(c/d)>4$.

2. The solid electrolyte of claim 1, wherein, in Formula 1, (c/d) is 5 or more.

3. The solid electrolyte of claim 1, wherein, in Formula 1, $5<(a+x)\leq 6$.

4. The solid electrolyte of claim 1, wherein, in Formula 1, $0<x\leq 0.07$.

5. The solid electrolyte of claim 1, wherein the compound is a compound represented by Formula 2:

$$Li_a M_x PS_b (Br)_c (Cl)_d$$   Formula 2 wherein, in Formula 2, M is Na, K, Fe, Mg, Ca, Ag, Cu, Zr, Zn, or a combination thereof,
$0<x\leq 0.07$, $5\leq a\leq 6$, $4\leq b\leq 6$, $0<c+d\leq 2$, $5<(a+x)\leq 6$, and $c/d>4$.

6. The solid electrolyte of claim 1, wherein the compound is a compound represented by Formula 3:

$$(Li_{1-x1}M_{x1})_{7-y}PS_{6-y}(Br_{1-x2}(Cl)_{x2})_y$$   Formula 3 wherein, in Formula 3, M is Na, K, Fe, Mg, Ca, Ag, Cu, Zr, Zn, or a combination thereof, and
$0<x<1$, $0<x2<1$, and $0\leq y\leq 2$.

7. The solid electrolyte of claim 1, wherein the compound represented by Formula 1 is a compound represented by Formula 4 or a compound represented by Formula 5:

$$(Li_{1-x1}Na_{x1})_{7-y}PS_{6-y}(Br_{1-x2}(Cl)_{x2})_y$$   Formula 4 wherein, in Formula 4, $0<x1<1$, $0<x2<1$, and $0\leq y\leq 2$, or $$(Li_{1-x1}K_{x1})_{7-y}PS_{6-y}(Br_{1-x2}(Cl)_{x2})_y$$   Formula 5 wherein, in Formula 5, $0<x1<1$, $0<x2<1$, and $0\leq y\leq 2$.

8. The solid electrolyte of claim 1, wherein the compound is $L_{15.45}Na_{0.05}PS_{4.5}Cl_{0.25}Br_{1.25}$, $Li_{5.45}Na_{0.05}PS_{4.5}Cl_{0.1}Br_{1.4}$, $Li_{5.5}Na_{0.05}PS_{4.5}C_{10.1}Br_{1.4}$, $Li_{4.95}Na_{0.05}PS_4Cl_{0.01}Br_{1.99}$, $Li_{5.45}K_{0.05}PS_{4.5}Cl_{0.25}Br_{1.25}$, $Li_{5.41}K_{0.05}PS_{4.5}Cl_{0.1}Br_{1.4}$, $Li_{4.95}K_{0.05}PS_4Cl_{0.01}Br_{1.99}$, $Li_{5.45}Na_{0.05}PS_{4.5}Cl_{1.5}$, $(Li_{5.45}Na_{0.05})PS_{4.5}Cl_{0.25}Br_{1.25}$, or a combination thereof.

9. The solid electrolyte of claim 1, wherein the compound of Formula 1 has a first peak at $=29.82°\pm 0.05°2\theta$ corresponding to a (311) crystal plane, and a second peak at 31.18°±0.05°2θ corresponding to a (222) crystal plane, when analyzed by X-ray diffraction using Cu Kα radiation.

10. The solid electrolyte of claim 1, wherein, when analyzed by X-ray diffraction using Cu Kα radiation, the compound of Formula 1, has a third peak at 44.62°±0.11°2θ corresponding to a (422) crystal plane, a fourth peak at 47.47°±0.12°2θ corresponding to a (511) crystal plane, and a fifth peak at 51.99°±0.1°2θ corresponding to a (440) crystal plane.

11. The solid electrolyte of claim 1, wherein the solid electrolyte has an ionic conductivity of about 1 millisiemen per centimeter or more, at room temperature.

12. An electrochemical battery comprising:
a cathode layer;
an anode layer; and
a solid electrolyte layer between the cathode layer and the anode layer,
wherein the at least one of the cathode layer or solid electrolyte layer comprises the solid electrolyte of claim 1.

13. The electrochemical battery of claim 12, wherein, the cathode layer comprises a solid electrolyte comprising a compound having an argyrodite crystal structure and represented by Formula 1:

$$Li_aM_xPS_bBr_cX_d \quad \text{Formula 1}$$

wherein, in Formula 1,
M is Na, K, Fe, Mg, Ca, Ag, Cu, Zr, Zn, or a combination thereof,
X is Cl, I, or a combination thereof,
0<x<1, 5<(a+x)<7, 5≤a≤6, 4≤b≤6, 0<(c+d)≤2, and (c/d)>4.

14. The electrochemical battery of claim 12, wherein the cathode layer comprises a cathode active material, a solid electrolyte, and a conductive material.

15. The electrochemical battery of claim 14, wherein a content of the solid electrolyte in the cathode layer is about 2 parts by weight to about 70 parts by weight, based on 100 parts by weight of the cathode active material.

16. The electrochemical battery of claim 14, wherein the electrochemical battery has a capacity retention of about 70 percent or more during a first cycle, after the electrochemical battery is charged to 4.25 volts at 45° C. or 60° C. and discharged.

17. The electrochemical battery of claim 12, wherein the solid electrolyte layer has a thickness of about 10 μm to about 200 μm.

18. The electrochemical battery of claim 12, wherein the anode layer comprises an anode current collector, and a first anode active material layer comprising an anode active material on the anode current collector, and
the anode active material comprises a carbon anode active material, a metal anode active material, a metalloid anode active material, or a combination thereof.

19. The electrochemical battery of claim 18, wherein the carbon anode active material comprises amorphous carbon, crystalline carbon, or a combination thereof, and
the metal anode active material or metalloid anode active material comprises Au, Pt, Pd, Si, Ag, Al, Bi, Sn, Zn, or a combination thereof.

20. The electrochemical battery of claim 18, further comprising:
a second anode active material layer between the anode current collector and the first anode active material layer, between the solid electrolyte layer and the first anode active material layer, or a combination thereof,
wherein the second anode active material layer is a metal layer comprising lithium or a lithium alloy.

21. The electrochemical battery of claim 12, wherein the cathode layer comprises a cathode active material, and the cathode active material is a lithium transition metal oxide having a layered crystal structure, a lithium transition metal oxide having an olivine crystal structure, a lithium transition metal oxide having a spinel crystal structure, or a combination thereof.

22. The electrochemical battery of claim 12, wherein the electrochemical battery is an all-solid-state secondary battery.

23. The electrochemical battery of claim 12, wherein a content of the solid electrolyte in the cathode layer is about 2 parts by weight to about 70 parts by weight, based on 100 parts by weight of a cathode active material.

24. A method of preparing a solid electrolyte, the method comprising:
providing a precursor mixture comprising a P precursor, a S precursor, a Br precursor, and an X precursor, wherein the X precursor comprises Cl, I, or a combination thereof;
contacting the precursor mixture to form a solid electrolyte precursor;
wherein an M precursor is added to the precursor mixture, and wherein M comprises Na, K, Fe, Mg, Ca, Ag, Cu, Zr, Zn, or a combination thereof; and
wherein the solid electrolyte is a compound having an argyrodite crystal structure and represented by Formula 1

$$Li_aM_xPS_bBr_cX_d \quad \text{Formula 1}$$

wherein, in Formula 1,
M is Na, K, Fe, Mg, Ca, Ag, Cu, Zr, Zn, or a combination thereof;
X is Cl, I, or a combination thereof, and
0<x<1, 5<(a+x)<7, 5≤a≤6, 4≤b≤6, 0<(c+d)≤2, and (c/d)>4.

25. The method of claim 24, wherein, in the contacting of the precursor mixture to prepare the solid electrolyte, the precursor mixture is reacted to obtain a solid electrolyte precursor, and the solid electrolyte precursor is heat-treated at 350° C. to 550° C. to prepare the solid electrolyte.

26. A solid electrolyte comprising:
a compound having an argyrodite crystal structure and represented by Formula 1

$$Li_aM_xPS_bBr_cX_d \quad \text{Formula 1}$$

wherein, in Formula 1,
M is Na, K, Fe, Mg, Ca, Ag, Cu, Zr, Zn, or a combination thereof;
X is Cl, I, or a combination thereof; and
0≤x<1, 5<(a+x)<7, 5≤a≤6, 4≤b≤6, 1.26≤(c+d)≤2, and (c/d)>4.

27. The solid electrolyte of claim 26, wherein the compound is $Li_{5.5}PS_{4.5}Cl_{0.25}Br_{1.25}$, $Li_{5.74}PS_{4.74}Cl_{0.01}Br_{1.25}$, $Li_5PS_4Cl_{0.01}Br_{1.99}$, or a combination thereof.

* * * * *